United States Patent
Ehrke

(10) Patent No.: US 7,264,268 B2
(45) Date of Patent: Sep. 4, 2007

(54) AIR BAG

(75) Inventor: Joseph M. Ehrke, Mt. Clemens, MI (US)

(73) Assignee: TK Holdings Inc., Auburn Hills, MI (US)

( * ) Notice: Subject to any disclaimer, the term of this patent is extended or adjusted under 35 U.S.C. 154(b) by 193 days.

(21) Appl. No.: 11/161,919

(22) Filed: Aug. 22, 2005

(65) Prior Publication Data

US 2006/0186655 A1   Aug. 24, 2006

Related U.S. Application Data

(60) Provisional application No. 60/593,847, filed on Feb. 18, 2005.

(51) Int. Cl.
*B60R 21/16* (2006.01)

(52) U.S. Cl. ............................ 280/729; 280/743.1

(58) Field of Classification Search ............ 280/743.1, 280/729, 739, 470, 743.2, 742; B60R 21/16
See application file for complete search history.

(56) References Cited

U.S. PATENT DOCUMENTS

| | | | | |
|---|---|---|---|---|
| 4,006,918 | A | 2/1977 | MacFarland | 280/729 |
| 5,172,933 | A | 12/1992 | Strasser | 280/740 |
| 5,282,646 | A | 2/1994 | Melvin et al. | 280/729 |
| 5,464,250 | A | 11/1995 | Sato | 280/743.1 |
| 5,599,041 | A | 2/1997 | Turnbull et al. | 280/724 |
| 6,019,390 | A | 2/2000 | Keshavaraj | 280/743.1 |
| 6,095,557 | A | 8/2000 | Takimoto et al. | 280/739 |
| 6,158,765 | A | 12/2000 | Sinnhuber | 280/728.3 |
| 6,170,857 | B1 | 1/2001 | Okada et al. | 280/728.1 |
| 6,176,512 | B1 | 1/2001 | Rodriguez | 280/728.2 |
| 6,260,881 | B1 | 7/2001 | Ellerbrok et al. | 280/740 |
| 6,352,284 | B1 | 3/2002 | Okada et al. | 280/743.1 |
| 6,361,067 | B1 | 3/2002 | Varcus et al. | 280/729 |
| 6,382,664 | B1 | 5/2002 | Hirano et al. | 280/730.2 |
| 6,428,042 | B1 | 8/2002 | Fischer et al. | 280/739 |
| 6,460,878 | B2 | 10/2002 | Eckert et al. | 280/730.1 |
| 6,523,855 | B2 | 2/2003 | Musiol et al. | 280/729 |
| 6,557,891 | B2 | 5/2003 | Okada et al. | 280/743.1 |
| 6,568,708 | B2 | 5/2003 | Miodek et al. | 280/740 |
| 6,592,146 | B2 | 7/2003 | Pinsenschaum et al. | 280/743.2 |

(Continued)

FOREIGN PATENT DOCUMENTS

DE   198 60 804 A1   7/2000

(Continued)

*Primary Examiner*—Paul N. Dickson
*Assistant Examiner*—Robert A. Coker
(74) *Attorney, Agent, or Firm*—Foley & Lardner LLP

(57) ABSTRACT

A duct is operative along and inside an outboard boundary of an air bag is adapted to distribute inflation gas to a distal portion thereof. A proximal second opening in the duct provides for fluid communication between the duct and interior of the air bag, but is normally obstructed by a valve element. A control element provides for opening the valve element when the air bag is sufficiently inflated in the absence of an out-of-position occupant, so as to provide more rapidly inflating the air bag through the second opening. A relatively distal third opening in the duct provides for fluid communication between the duct and the interior of the air bag, and the air bag is vented from the duct through a relatively distal vent along an outboard boundary.

31 Claims, 10 Drawing Sheets

U.S. PATENT DOCUMENTS

| | | |
|---|---|---|
| 6,832,778 B2 | 12/2004 | Pinsenschaum et al. .... 280/739 |
| 6,932,385 B2 * | 8/2005 | Hawthorn et al. .......... 280/739 |
| 7,083,192 B2 * | 8/2006 | Fischer et al. .............. 280/739 |
| 2002/0017774 A1 | 2/2002 | Igawa ..................... 280/728.2 |
| 2003/0034637 A1 | 2/2003 | Wang et al. ................ 280/729 |
| 2003/0201628 A1 | 10/2003 | Roychoudhury et al. ... 280/729 |
| 2004/0012180 A1 | 1/2004 | Hawthorn et al. .......... 280/739 |
| 2004/0051285 A1 | 3/2004 | Fischer ....................... 280/739 |
| 2004/0051286 A1 | 3/2004 | Fischer et al. .............. 280/739 |
| 2004/0145160 A1 | 7/2004 | Hasebe et al. .............. 280/729 |
| 2004/0145161 A1 | 7/2004 | Hasebe et al. .............. 280/729 |
| 2004/0155439 A1 | 8/2004 | Hasebe et al. .............. 280/729 |
| 2004/0155440 A1 | 8/2004 | Hasebe et al. .............. 280/729 |
| 2004/0232677 A1 | 11/2004 | Fischer et al. .............. 280/739 |
| 2005/0023811 A1 | 2/2005 | Thomas ....................... 280/736 |
| 2005/0040634 A1 * | 2/2005 | Braun et al. ................ 280/742 |
| 2005/0098990 A1 | 5/2005 | Pinsenschaum et al. .... 280/739 |
| 2005/0127648 A1 | 6/2005 | Fischer et al. .............. 280/739 |
| 2005/0151359 A1 * | 7/2005 | Marriott .................. 280/743.1 |

FOREIGN PATENT DOCUMENTS

| | | |
|---|---|---|
| EP | 1 364 838 A | 11/2003 |
| EP | 1 452 403 A | 9/2004 |
| WO | WO 2004/094201 A1 | 11/2004 |

* cited by examiner

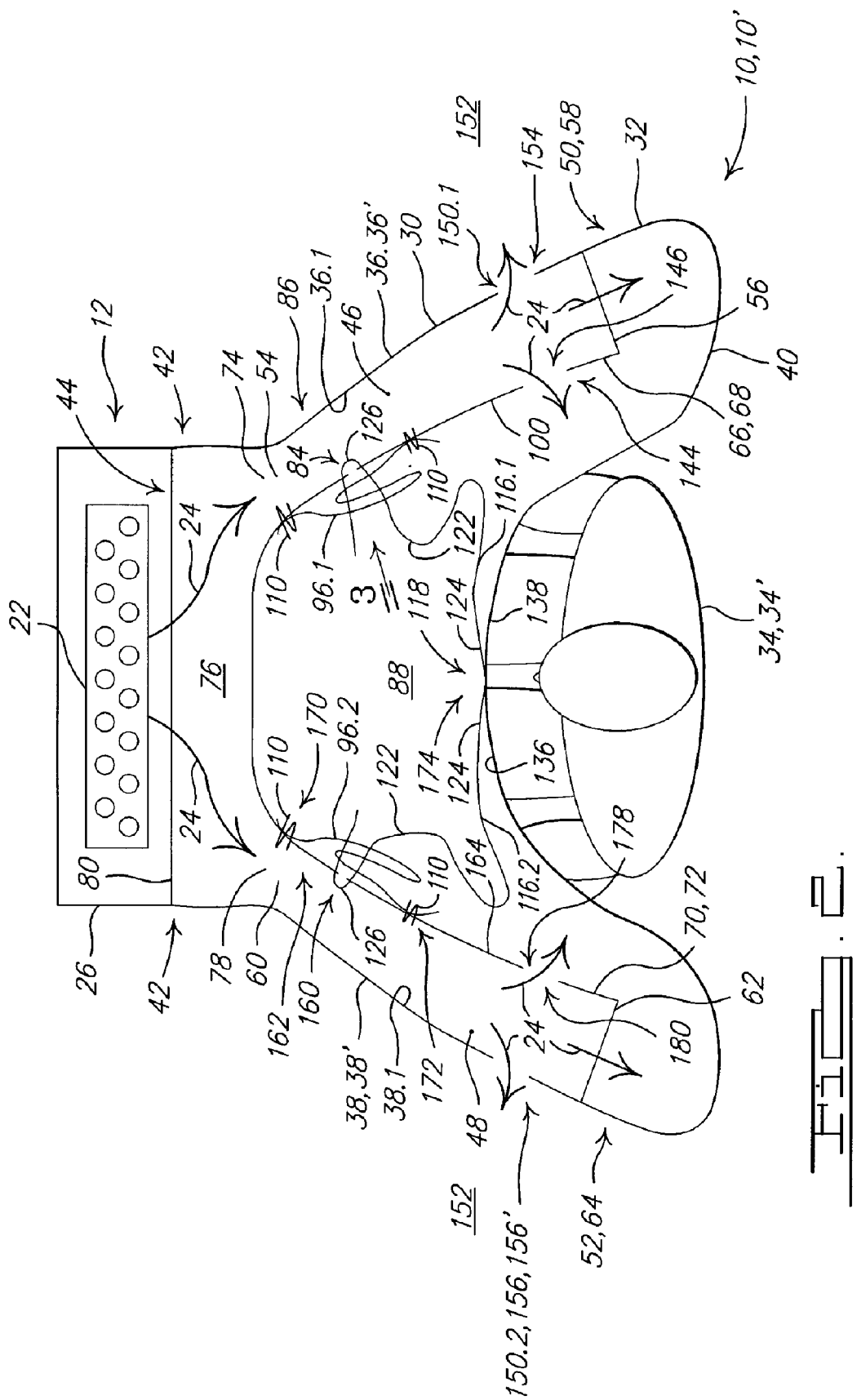

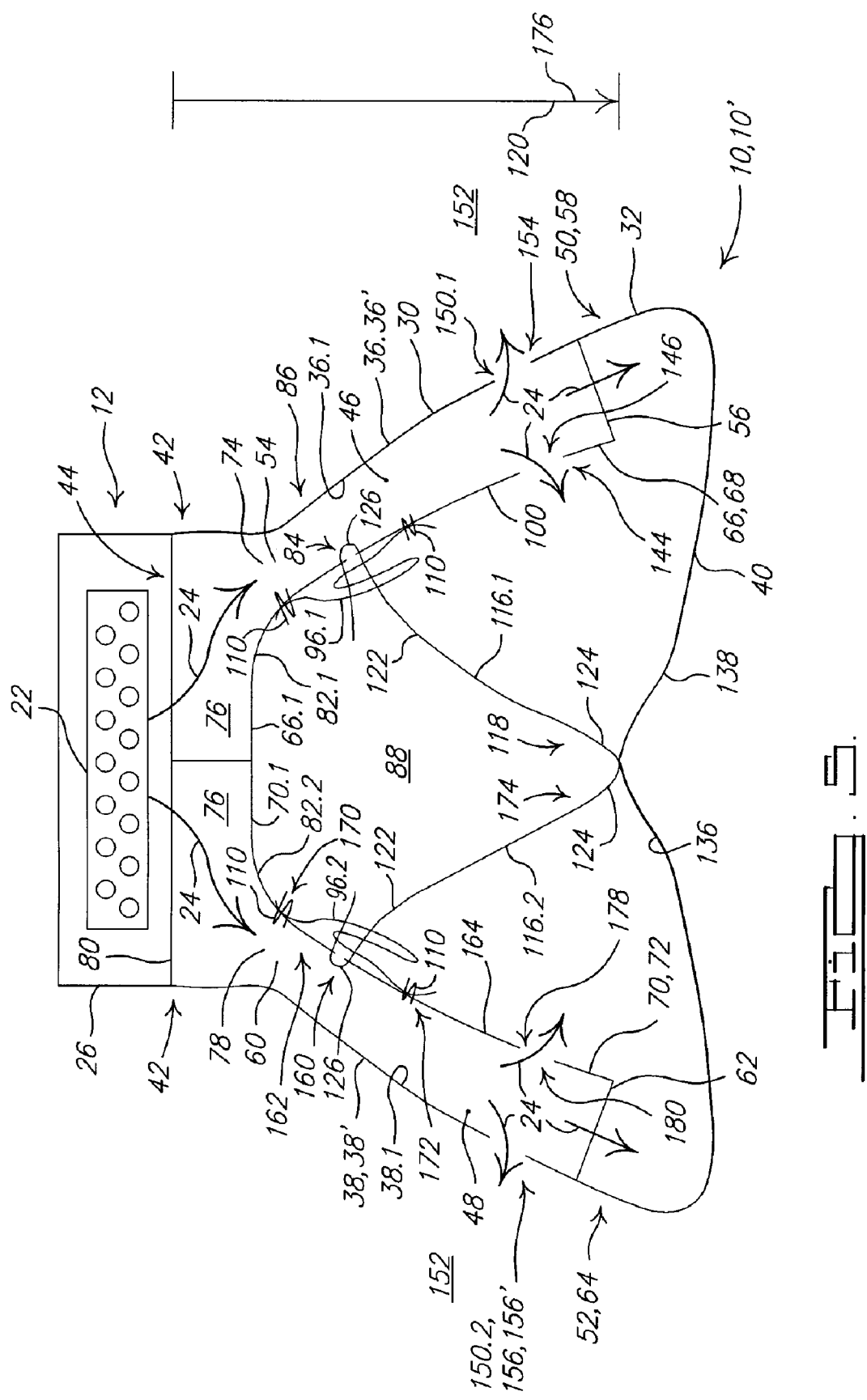

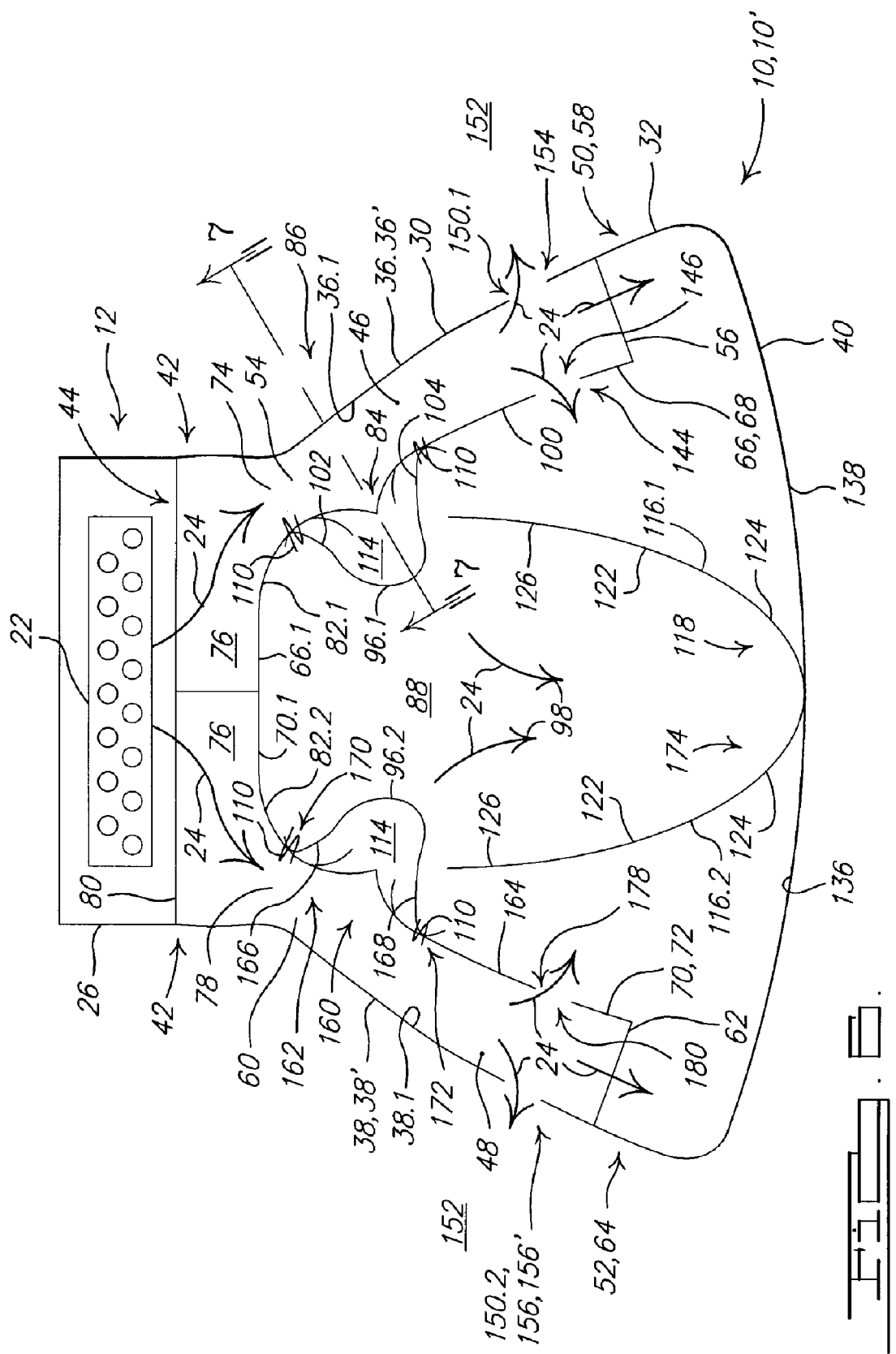

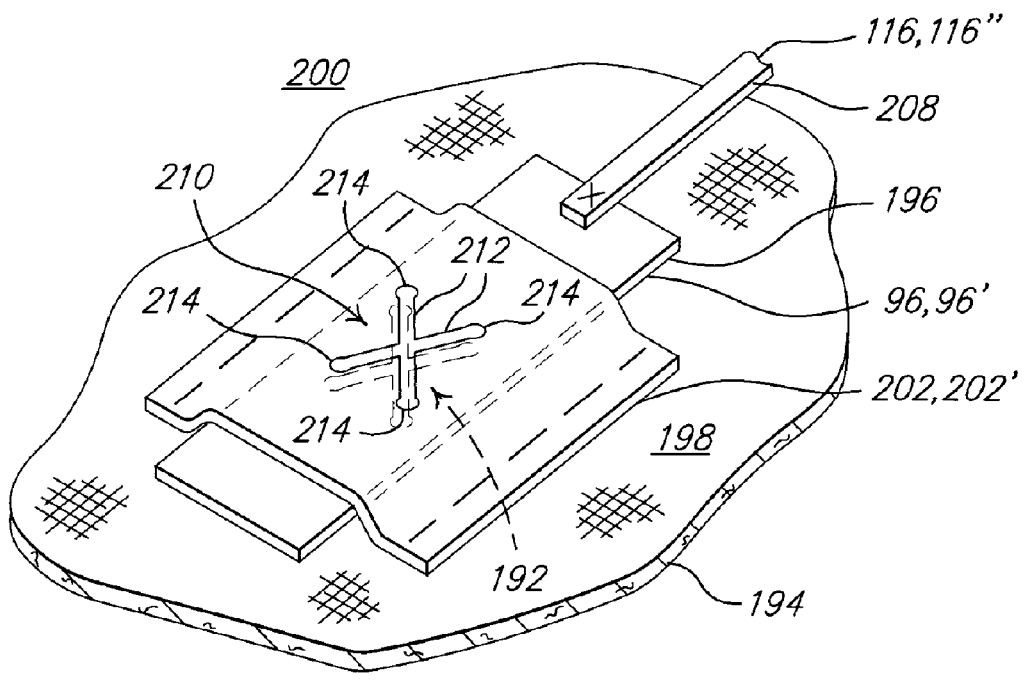
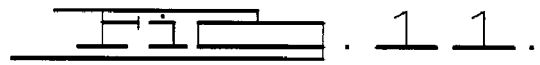
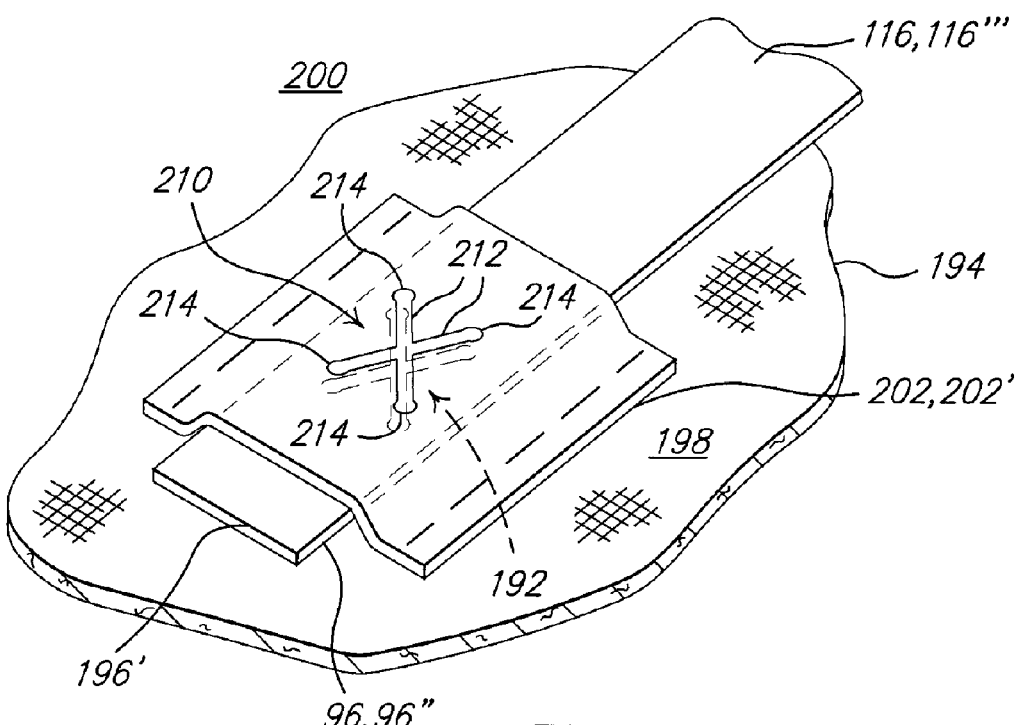
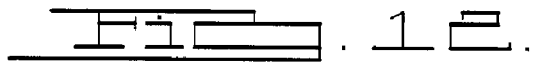

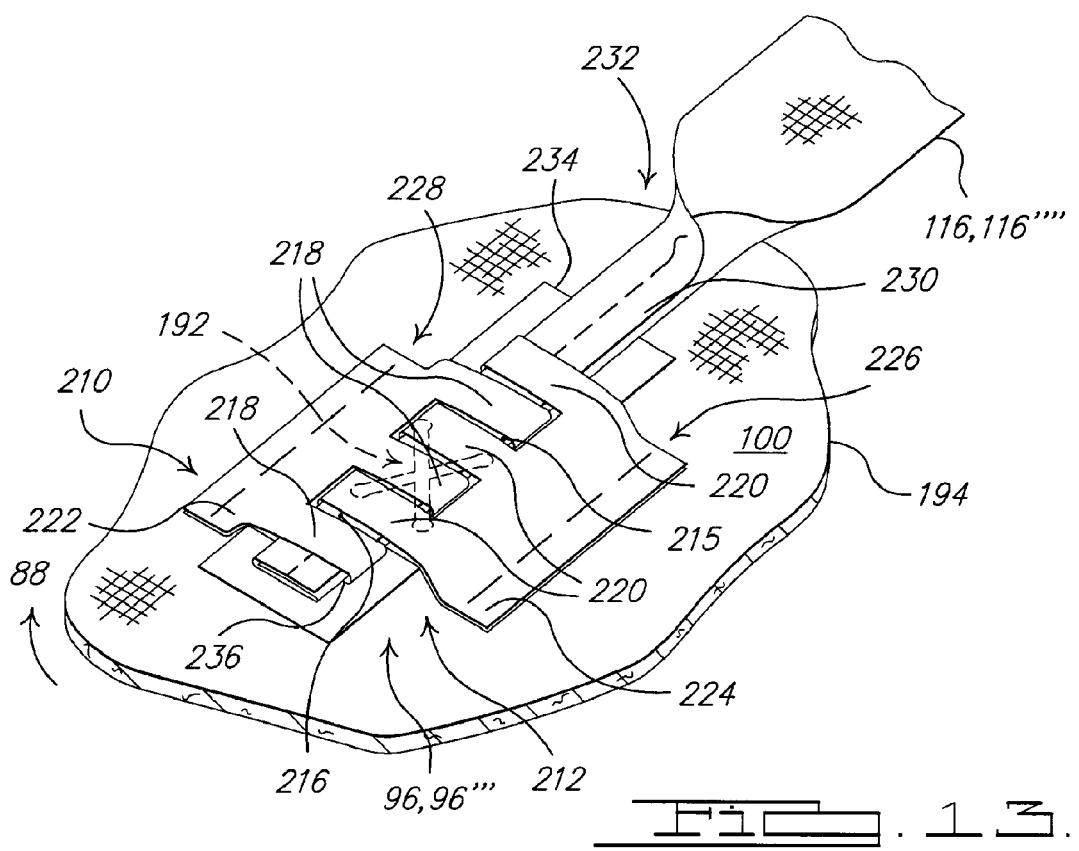
FIG. 13.
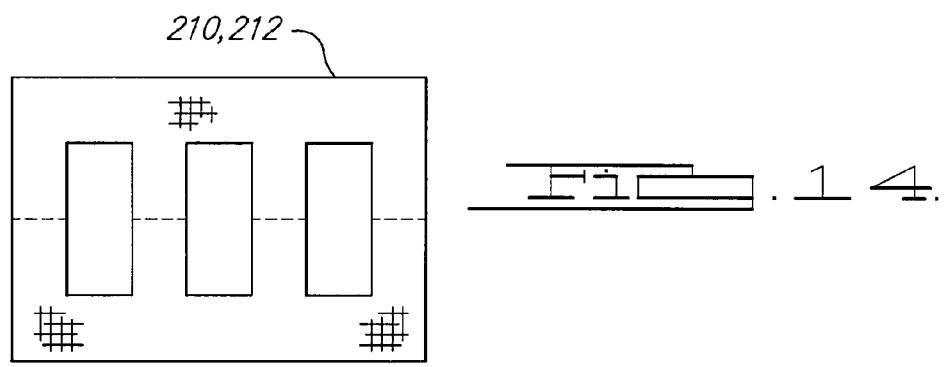
FIG. 14.
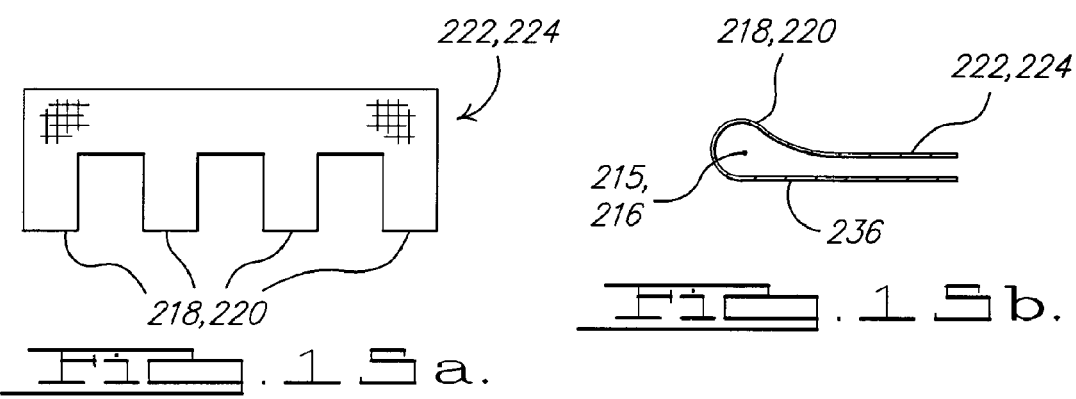
FIG. 15a.
FIG. 15b.

AIR BAG

BACKGROUND

U.S. application Ser. No. 10/908,952 filed on Jun. 1, 2005, claiming benefit of prior U.S. Provisional Application Ser. No. 60/593,847 filed on Feb. 18, 2005, discloses an air bag incorporating a plurality of ducts. The above-identified applications are incorporated herein by reference in their entirety.

BRIEF DESCRIPTION OF THE DRAWINGS

In the accompanying drawings:

FIG. 2 illustrates a top cross-sectional view of a first embodiment of an air bag incorporating a plurality of ducts and associated control valves, during the inflation thereof in proximity to an out-of-position occupant;

FIG. 5 illustrates a top cross-sectional view of the first embodiment of the air bag incorporating the plurality of ducts and associated valve elements, during the unimpeded inflation thereof, just prior to the opening of the associated valve elements;

FIG. 6 illustrates a top cross-sectional view of the first embodiment of the air bag incorporating the plurality of ducts and associated valve elements, during the unimpeded inflation thereof after the associated valve elements have opened;

FIG. 11 illustrates a second embodiment of the second aspect of the valve element attached to an inside surface of the duct;

FIG. 12 illustrates a third embodiment of the second aspect of the valve element attached to an inside surface of the duct;

FIG. 13 illustrates a third aspect of a valve element attached to an outside surface of a duct;

FIG. 14 illustrates a lattice used in the third aspect of the valve element illustrated in FIG. 13;

FIGS. 15a and 15b illustrate plan and end views, respectively, of a folded lattice of FIG. 14, used in the third aspect of the valve element illustrated in FIG. 13;

DETAILED DESCRIPTION OF THE PREFERRED EMBODIMENTS

Figure 1:
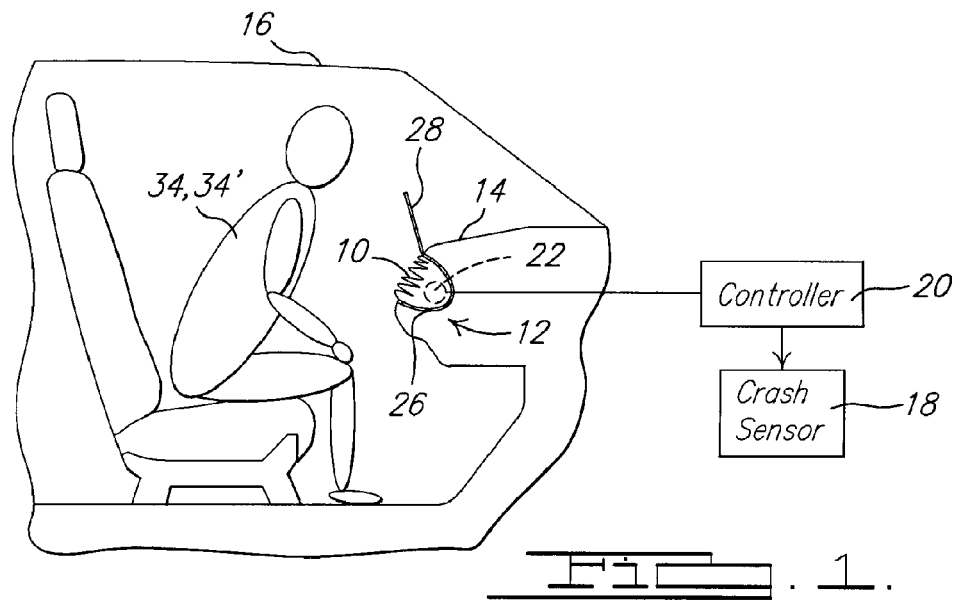
FIG. 1 illustrates an out-of-position occupant proximate to an air bag inflator module operating in a vehicle.

Referring to FIGS. 1 and 2, an air bag 10 is incorporated in an associated air bag inflator module 12 installed, for example, with a mid-mount orientation in the instrument panel 14 of a vehicle 16. Responsive to a crash of the vehicle 16, an associated crash sensor 18 signals a controller 20 to actuate an air bag inflator 22 of the air bag inflator module 12, whereby the air bag inflator 22 generates inflation gas 24, that inflates the air bag 10 packed in a housing 26 of the air bag inflator module 12, the pressurization of which opens an associated air bag module door 28 during the deployment of the air bag 10 from the housing 26 of the air bag inflator module 12.

Referring to FIGS. 2-8, in accordance with a first embodiment, the air bag 10' comprises a single air bag cushion portion 30 constructed of air bag material 32, for example, a fabric, e.g., nylon or polyester weave, which may be coated, e.g. with a silicone rubber coating; some other material that is known for use in fabricating an air bag such as plastic film or polyolefin (e.g. TYVEK®), or some other material that is sufficiently flexible, strong and durable for use in confining inflation gas 24 generated by the air bag inflator 22 and for interacting with an occupant 34 so as to provide for the restraint thereof responsive to a crash. For example, for the passenger-side embodiment illustrated in FIGS. 2-8, the air bag 10' comprises first 36 and second 38 outboard panels connected to a continuous face panel 40 therebetween, wherein the first 36 and second 38 outboard panels define corresponding first 36' and second 38' outboard boundaries of the air bag 10'. Proximal portions 42 of the first 36 and second 38 outboard panels and the face panel 40 surround a first opening 44 adapted to operatively couple to the housing 26 of the air bag inflator module 12, and thereby receive inflation gas 24 from the associated air bag inflator 22. The air bag 10' further comprises first 46 and second 48 ducts, each of which extends along the inside 36.1, 38.1 of the first 36' and second 38' outboard boundaries respectively, and each of which is operative between the first opening 44 and respective relatively distal portions 50, 52 of the air bag 10'. For example, the first duct 46 extends from a first inlet 54 thereof to a first outlet 56 thereof, wherein the first inlet 54 is in fluid communication with the first opening 44 of the air bag 10' and the first outlet 56 is adapted to discharge inflation gas 24 into a first distal portion 58 of the air bag cushion portion 30, and the second duct 48 extends from a second inlet 60 thereof to a second outlet 62 thereof, wherein the second inlet 60 is in fluid communication with the first opening 44 of the air bag 10' and the second outlet 62 is adapted to discharge inflation gas 24 into a second distal portion 64 of the air bag cushion portion 30. For example, in one embodiment, the first duct 46 comprises a first panel 66 of air bag material 32 formed as a first channel 68 operatively coupled to the inside 36.1 of the first outboard boundary 36' of the air bag cushion portion 30, and the second duct 48 comprises a second panel 70 of air bag material 32 formed as a second channel 72 operatively coupled to the inside 38.1 of the second outboard boundary 38' of the air bag cushion portion 30.

The first inlet 54 of the first duct 46 is operatively coupled to a first outlet 74 of a manifold 76, and the second inlet 60 of the second duct 48 is operatively coupled to a second outlet 78 of the manifold 76, wherein the first 74 and second 78 outlets are on opposite ends of the manifold 76, the inlet 80 of which is the first opening 44 of the air bag 10'. The manifold 76 is substantially sealed to the proximal portions 42 of the face panel 40 and to the first 54 and second 60 inlets of the first 46 and second 48 ducts so as to provide for directing substantially all of the inflation gas 24 from the air bag inflator 22 into the first 46 and second 48 ducts upon actuation of the air bag inflator module 12 responsive to a crash. The manifold 76 may be either comprise a separate panel of air bag material 32, or an operative coupling of associated extensions 82.1, 82.2 of the first 66 and second 70 panels to the face panel 40 and to one another at proximal ends 66.1, 70.1 thereof along a surface of the manifold 76. For example, the operative coupling of the first 66 and second 70 panels to the first 36' and second 38' outboard boundaries so as to form the first 46 and second 48 ducts, and the operative coupling of the extensions 80.1, 80.2 of the first 66 and second 70 panels to the face panel 40 and to one another at the proximal ends 66.1, 70.1 of the extensions 80.1, 80.2, may be by any of a variety of known processes for joining air bag material 32, for example, by sewing, bonding or welding; or the associated components may comprise portions of a continuous piece of air bag material 32. Accordingly, the first 46 and second 48 ducts either constitute or are operatively coupled to a manifold 76 proximate to the first opening, the manifold 76 is adapted to receive the inflation gas 24 through the first opening 44, and the manifold 76 is adapted to distribute the inflation gas 24 to the first 46 and second 48 ducts through the first 54 and second 60 inlets thereof. Accordingly the first 46 and second 48 ducts function as distribution tubes that provide for distributing inflation gas 24 from the manifold 76 to relatively distal portions 50, 52 of the air bag 10'.

The first duct 46 incorporates a second opening 84 located proximate to a proximal portion 86 of the first duct 46 relative to the first opening 44, wherein, when open, the second opening 84 is adapted to provide for fluid communication between the first duct 46 proximate to the first inlet 54 thereof, and an interior 88 of the air bag cushion portion 30. For example, referring to FIG. 3, the second opening 84 may comprise a plurality of cuts 90, e.g. pair of cross-cuts 92, each of which is terminated with an associated stress-relief hole 94 adapted to prevent tearing of the associated air bag material 32 of the first duct 46 upon the opening of the second opening 84. Alternatively, the second opening 84 could comprise an associated cutout portion of the first duct 46, e.g. an orifice.

A first valve element 96.1 in cooperative relationship with the second opening 84 is adapted to normally obstruct the second opening 84 so as to inhibit a flow 98 of the inflation gas 24 therethrough. For example, referring to FIGS. 2-8, in accordance with a first aspect, the first valve element 96.1 is located on a first side 100 of the first duct 46 facing the interior 88 of the air bag cushion portion 30. The first valve element 96.1 is constructed from air bag material 32 comprising first 102 and second 104 end portions, attached to the first duct 46 at a first 106 and second 108 locations respectively, for example, with associated sewn seams 110, spanning the second opening 84 at relatively proximal 106 and relatively distal 108 locations respectively. In accordance with the first aspect, the first valve element 96.1 is longer than the distance 112 between the first 106 and second 108 locations on the first duct 46, so when opened by the inflation gas 24 from the second opening 84, the first valve element 96.1 extends inwards from the first duct 46 so as to provide for the flow 98 of inflation gas 24 from the second opening 84 through the resulting gap 114 between the first valve element 96.1 and the first duct 46.

A first control element 116.1 provides for holding the first valve element 96.1 in a normally closed position, for example, as illustrated in FIGS. 2-5. The first control element 116.1 is operative between the first valve element 96.1 and a first relatively distal portion 118 of either the air bag cushion portion 30 or the first duct 46, and is adapted so as to provide for opening the first valve element 96.1 when the first relatively distal portion 118 of the air bag cushion portion 30, or the first duct 46, is extended beyond a first threshold 120 relative to the first opening 44.

Figure 3:
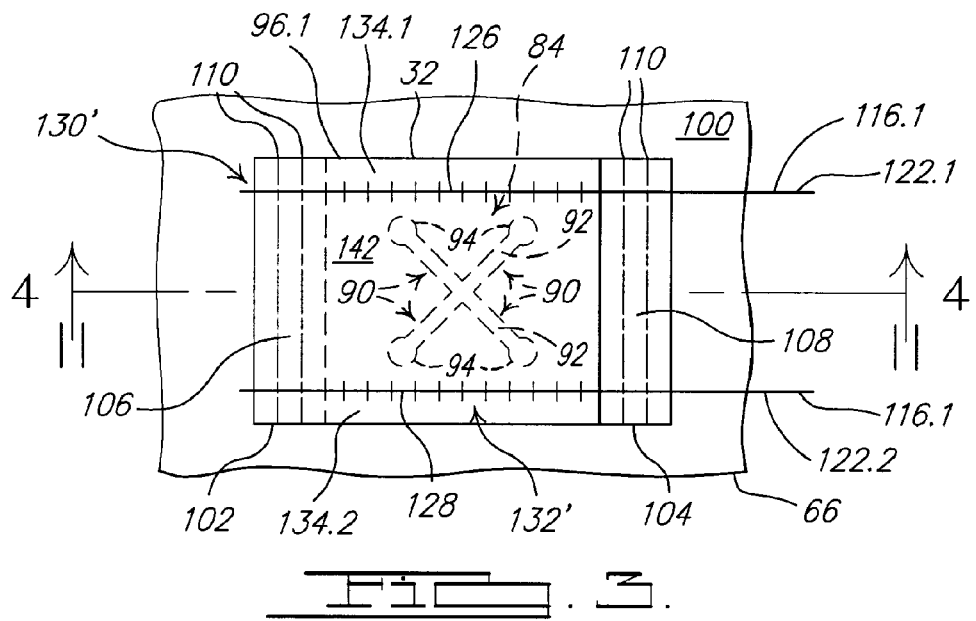
FIG. 3 illustrates a fragmentary plan view of a first aspect of a valve element operatively associated with the air bag illustrated in FIG. 2.
Figure 4:
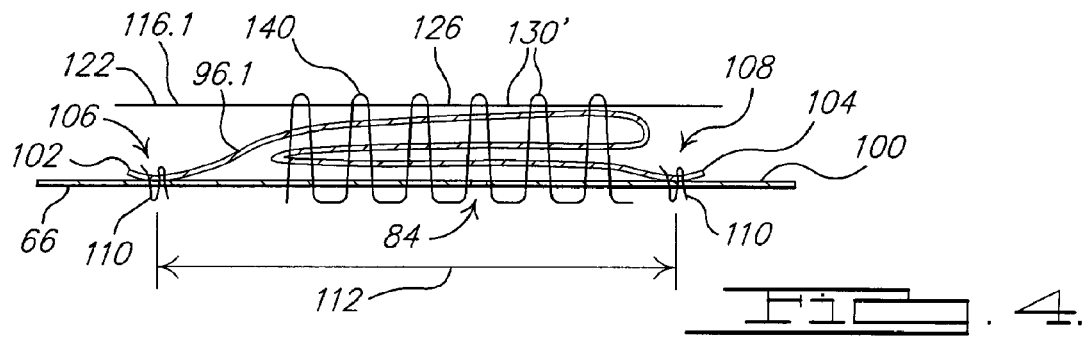
FIG. 4 illustrates a fragmentary side cross-sectional view of the first aspect of the valve element and air bag illustrated in FIG. 3.
Figure 7:
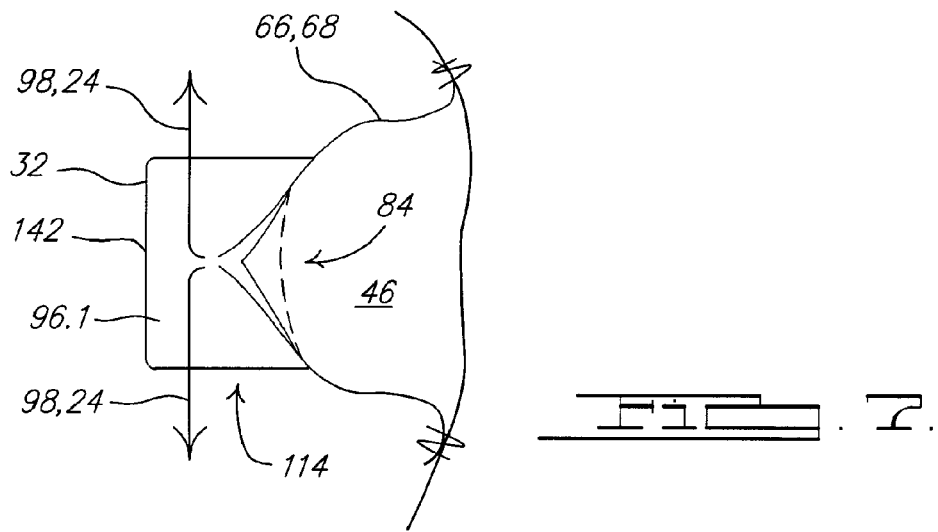
FIG. 7 illustrates a fragmentary cross-sectional view of duct and associated open valve element operatively associated therewith, for the air bag illustrated in FIG. 6.

For example, referring to FIGS. 2-5, in accordance with the first aspect, the first control element 116.1 comprises at least one tensile element 122, a distal portion 124 of which is operatively coupled to the first relatively distal portion 118 of either the air bag cushion portion 30 or the first duct 46, and first 126 and second 128 proximal portions of which are incorporated in corresponding first 130 and second 132 releasable stitches adapted to secure the first valve element 96.1 to the first duct 46 along opposing side portions 134.1, 134.2 thereof between the first 106 and second 108 locations, wherein the first valve element 96.1 folded back on itself prior to stitching. Referring to FIGS. 2, 5 and 6, in one embodiment, the distal portion 124 of the at least one tensile element 122 is operatively coupled to an inside 136 of a face portion 138 of the air bag cushion portion 30. Referring to FIGS. 3 and 4, in one embodiment, the first 130 and second 132 releasable stitches comprise first 130' and second 132' lock stitches, wherein the associated loop portions 140 thereof extend through both the first duct 46 and the first valve element 96.1 towards the interior 88 of air bag cushion portion 30 and engage the first 126 and second 128 proximal portions of the at least one tensile element 122 on an interior side 142 of the first valve element 96.1, so that first 126 and second 128 proximal portions of the at least one tensile element 122 may be pulled through the loop portions 140 responsive to a tensile force applied to the at least one tensile element 122 from the distal portion 124 thereof so as to release the first and second lock stitches. For example, the at least one tensile element 122 may comprise either a single continuous tensile element 122' or separate first 122.1 and second 122.2 tensile elements. For example, the at least one tensile element 122 may comprise a thread, e.g. of KEV-LAR®, a fabric cord, or constructed from air bag material 32. The length of the at least one tensile element 122 between the first valve element 96.1 and the first relatively distal portion 118 of either the air bag cushion portion 30 or the first duct 46 is the shorter than the distance therebetween when the air bag cushion portion 30 is inflated beyond a threshold, so as to provide for releasing the first 130 and second 132 releasable stitches, and thereby opening the associated first valve element 96.1, when the air bag cushion portion 30 is inflated beyond the threshold.

Figure 8:
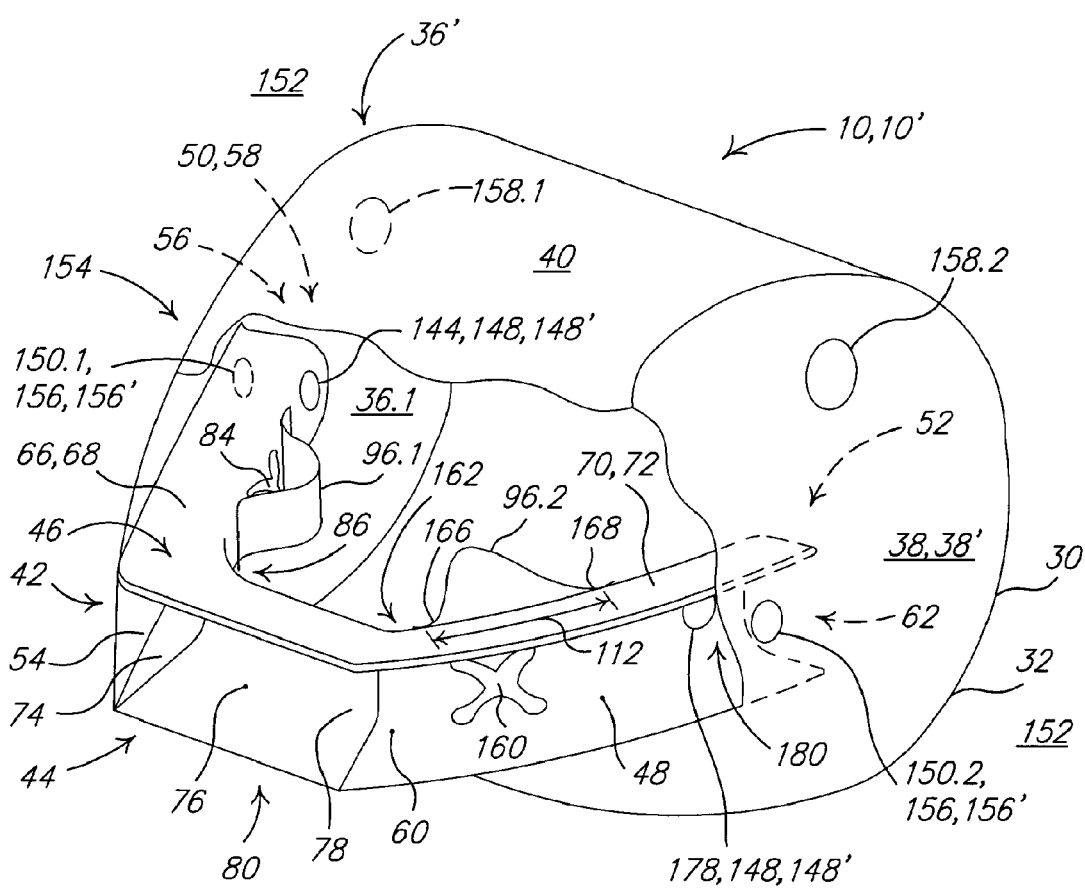
FIG. 8 illustrates an isometric view of the first embodiment of the air bag incorporating the plurality of ducts and associated valve elements, with a fragmentary view of an internal portion thereof.

In another embodiment, the first duct 46 may further incorporate a third opening 144 therein located at a relatively distal location 146 relative to the second opening 84, i.e. downstream thereof, and adapted to provide for fluid communication between the first duct 46 and the interior 88 of the air bag cushion portion 30. For example, as with the second opening 84, the third opening 144 may comprise a plurality of cuts 90, e.g. pair of cross-cuts 92, each of which is terminated with an associated stress-relief hole 94 adapted to prevent tearing of the associated air bag material 32 of the first duct 46 upon opening of the third opening 144. Alternatively, as illustrated in FIGS. 2, 5 and 8, the third opening 144 could comprise an associated cutout portion 148 of the first duct 46, e.g. an orifice 148'. The third opening 144 provides for inflating the interior 88 of the air bag cushion portion 30 regardless of whether or not the second opening 84 or first outlet 56 are obstructed during the deployment of the air bag 10', but at an associated inflation rate that would not be injurious to an out-of-position occupant 34'. For example, in one embodiment, the second opening 84 is substantially larger than the third opening 144, although regardless of the relative size, the first duct 46 provides for some attenuation of the flow of inflation gas 24 therethrough, and if not obstructed by the first valve element 96.1, the relatively close proximity of the second opening 84 to the first opening 44 provides for bypassing substantially most of the inflation gas 24 therethrough into the interior 88 of the air bag cushion portion 30.

In yet another embodiment, the first duct 46 may further cooperate with a first vent opening 150.1 in the first outboard boundary 36' of the air bag cushion portion 30 adapted to provide for fluid communication between the first duct 46 and an exterior 152 of the air bag cushion portion 30, wherein the first vent opening 150.1 is located at a relatively distal location 154 relative to the second opening 84. The first vent opening 150.1 provides as necessary for preventing an over-pressurization of the first duct 46 from the inflation gas 24 flowing therethrough, for example, as might be caused by an obstruction of the third opening 144 and the first outlet 56 by the folded air bag 10' during the inflation thereof, for example, as might result from an interaction thereof with an out-of-position occupant 34'. The first vent opening 150.1 is otherwise sized so as to otherwise limit the loss of inflation gas 24 therethrough. For example, in one embodiment, the third opening 144 is larger than the first vent opening 150.1. As with the second 84 and third 144 openings, the first vent opening 150.1 may comprise a plurality of cuts 90, e.g. pair of cross-cuts 92, each of which is terminated with an associated stress-relief hole 94 adapted to prevent tearing of the associated air bag material 32 of the first duct 46 upon opening of the first vent opening 150.1, or as illustrated in FIGS. 2, 5 and 8, the first vent opening 150.1 could comprise an associated cutout portion 148 of the first duct 46, e.g. an orifice 148'.

Referring to FIG. 8, in yet another embodiment, the first outboard boundary 36' of the air bag cushion portion 30 may incorporate a first primary vent 156.1 adapted to provide for venting inflation gas 24 from the air bag 10 responsive to an interaction thereof with an occupant 34 responsive to a crash, so as to provide for dissipating the energy of the occupant 34 relative to the vehicle 16. Alternatively, the first vent opening 150.1 can be adapted to provide for both mitigating against over-pressurization of the first duct 46 and for venting the inflation gas 24 from the air bag 10 responsive to an interaction thereof with an occupant 34 responsive to a crash, for example, depending upon the shape of the first vent opening 150.1 and the proximity thereof to the first outlet 56 of the first duct 46.

Referring to FIGS. 2-8, similar to the first duct 46, the second duct 48 incorporates a fourth opening 160 located proximate to a proximal portion 162 of the second duct 48 relative to the first opening 44, wherein, when open, the fourth opening 160 is adapted to provide for fluid communication between the second duct 48 proximate to the second inlet 60 thereof, and an interior 88 of the air bag cushion portion 30. For example, similar to the second opening 84 illustrated in FIG. 3, the fourth opening 160 may comprise a plurality of cuts 90, e.g. pair of cross-cuts 92, each of which is terminated with an associated stress-relief hole 94 adapted to prevent tearing of the associated air bag material 32 of the second duct 48 upon the opening of the fourth opening 160. Alternatively, the fourth opening 160 could comprise an associated cutout portion of the second duct 48, e.g. an orifice.

A second valve element 96.2 in cooperative relationship with the fourth opening 160 is adapted to normally obstruct the fourth opening 160 so as to inhibit a flow 98 of the inflation gas 24 therethrough. For example, referring to FIGS. 2-8, in accordance with a first aspect, the second valve element 96.2 is located on a first side 164 of the second duct 48 facing the interior 88 of the air bag cushion portion 30. The second valve element 96.2 is constructed from air bag material 32 comprising first 166 and second 168 end portions, attached to the second duct 48 at a third 170 and fourth 172 locations respectively, for example, with associated sewn seams 110, spanning the fourth opening 160 at relatively proximal 170 and relatively distal 172 locations respectively. In accordance with the first aspect, the second valve element 96.2 is longer than the distance 112 between the third 170 and fourth 172 locations on the second duct 48, so when opened by the inflation gas 24 from the fourth opening 160, the second valve element 96.2 extends inwards from the second duct 48 so as to provide for the flow 98 of inflation gas 24 from the fourth opening 160 through the resulting gap 114 between the second valve element 96.2 and the second duct 48.

A second control element 116.2 provides for holding the second valve element 96.2 in a normally closed position, for example, as illustrated in FIGS. 2-5. The second control element 116.2 is operative between the second valve element 96.2 and a second relatively distal portion 174 of either the air bag cushion portion 30 or the second duct 48, and is adapted so as to provide for opening the second valve element 96.2 when the second relatively distal portion 174 of the air bag cushion portion 30, or the second duct 48, is extended beyond a second threshold 176 relative to the first opening 44.

For example, referring to FIGS. 2-5, in accordance with the first aspect, the second control element 116.2 comprises at least one tensile element 122, a distal portion 124 of which is operatively coupled to the second relatively distal portion 174 of either the air bag cushion portion 30 or the second duct 48, and first 126 and second 128 proximal portions of which are incorporated in corresponding first 130 and second 132 releasable stitches adapted to secure the second valve element 96.2 to the second duct 48 along opposing side portions 134.1, 134.2 thereof between the third 170 and fourth 172 locations, wherein the second valve element 96.2 folded back on itself prior to stitching. Referring to FIGS. 2, 5 and 6, in one embodiment, the distal portion 124 of the at least one tensile element 122 is operatively coupled to an inside 136 of a face portion 138 of the air bag cushion portion 30. For example, similar to that illustrated in FIGS. 3 and 4, in one embodiment, the first 130 and second 132 releasable stitches comprise first 130' and second 132' lock stitches, wherein the associated loop portions 140 thereof extend through both the second duct 48 and the second valve element 96.2 towards the interior 88 of air bag cushion portion 30 and engage the first 126 and second 128 proximal portions of the at least one tensile element 122 on an interior side 142 of the second valve element 96.2, so that first 126 and second 128 proximal portions of the at least one tensile element 122 may be pulled through the loop portions 140 responsive to a tensile force applied to the at least one tensile element 122 from the distal portion 124 thereof so as to release the first and second lock stitches. For example, the at least one tensile element 122 may comprise either a single continuous tensile element 122' or separate first 122.1 and second 122.2 tensile elements. The length of the at least one tensile element 122 between the second valve element 96.2 and the second relatively distal portion 174 of either the air bag cushion portion 30 or the second duct 48 is the shorter than the distance therebetween when the air bag cushion portion 30 is inflated beyond a threshold, so as to provide for releasing the first 130 and second 132 releasable stitches, and thereby opening the associated second valve element 96.2, when the air bag cushion portion 30 is inflated beyond the threshold.

In another embodiment, the second duct 48 may further incorporate a fifth opening 178 therein located at a relatively distal location 180 relative to the fourth opening 160, i.e. downstream thereof, and adapted to provide for fluid communication between the second duct 48 and the interior 88 of the air bag cushion portion 30. For example, as with the fourth opening 160, the fifth opening 178 may comprise a plurality of cuts 90, e.g. pair of cross-cuts 92, each of which is terminated with an associated stress-relief hole 94 adapted to prevent tearing of the associated air bag material 32 of the second duct 48 upon opening of the fifth opening 178. Alternatively, as illustrated in FIGS. 2, 5 and 8, the fifth opening 178 could comprise an associated cutout portion 148 of the second duct 48, e.g. an orifice 148'. The fifth opening 178 provides for inflating the interior 88 of the air bag cushion portion 30 regardless of whether or not the fourth opening 160 or second outlet 62 are obstructed during the deployment of the air bag 10', but at an associated inflation rate that would not be injurious to an out-of-position occupant 34'. For example, in one embodiment, the fourth opening 160 is substantially larger than the fifth opening 178, although regardless of the relative size, the second duct 48 provides for some attenuation of the flow of inflation gas 24 therethrough, and if not obstructed by the second valve element 96.2, the relatively close proximity of the fourth opening 160 to the first opening 44 provides for bypassing substantially most of the inflation gas 24 therethrough into the interior 88 of the air bag cushion portion 30.

In yet another embodiment, the second duct 48 may further cooperate with a second vent opening 150.2 in the second outboard boundary 38' of the air bag cushion portion 30 adapted to provide for fluid communication between the second duct 48 and an exterior 152 of the air bag cushion portion 30, wherein the second vent opening 150.2 is located at a relatively distal location 182 relative to the fourth opening 160. The second vent opening 150.2 provides as necessary for preventing an over-pressurization of the second duct 48 from the inflation gas 24 flowing therethrough, for example, as might be caused by an obstruction of the fifth opening 178 and the second outlet 62 by the folded air bag 10' during the inflation thereof, for example, as might result from an interaction thereof with an out-of-position occupant 34'. The second vent opening 150.2 is otherwise sized so as to otherwise limit the loss of inflation gas 24 therethrough. For example, in one embodiment, the fifth opening 178 is larger than the second vent opening 150.2. As with the first vent opening 150.1, the second vent opening 150.2 may comprise a plurality of cuts 90, e.g. pair of cross-cuts 92, each of which is terminated with an associated stress-relief hole 94 adapted to prevent tearing of the associated air bag material 32 of the second duct 48 upon opening of the second vent opening 150.2, or as illustrated in FIGS. 2, 5 and 8, the second vent opening 150.2 could comprise an associated cutout portion 156 of the second duct 48, e.g. an orifice 156'.

Referring to FIG. 8, in yet another embodiment, the second outboard boundary 38' of the air bag cushion portion 30 may incorporate a second primary vent 158.2 adapted to provide for venting inflation gas 24 from the air bag 10 responsive to an interaction thereof with an occupant 34 responsive to a crash, so as to provide for dissipating the energy of the occupant 34 relative to the vehicle 16. Alternatively, the second vent opening 150.2 can be adapted to provide for both mitigating against over-pressurization of the second duct 48 and for venting the inflation gas 24 from the air bag 10 responsive to an interaction thereof with an occupant 34 responsive to a crash, for example, depending upon the shape of the second vent opening 150.2 and the proximity thereof to the second outlet 62 of the second duct 48.

In operation, responsive to a crash of the vehicle 16, the crash sensor 18 signals the controller 20 to actuate the air bag inflator 22 of the air bag inflator module 12, thereby generating inflation gas 24 that inflates the air bag 10 packed in the housing 26 of the air bag inflator module 12, the pressurization of which opens the air bag module door 28 during the deployment of the air bag 10 from the housing 26 of the air bag inflator module 12. The inflation gas 24 flows into the first opening 44 of the air bag 10 and the inlet 80 of the manifold 76 located proximate thereto, and then out of the first 74 and second 78 outlets thereof into the first 54 and second 60 inlets of the first 46 and second 48 ducts respectively. The first 96.1 and second 96.2 valve elements are initially closed so as to obstruct the associated respective second 84 and fourth 160 openings, so that the inflation gas 24 flows through the first 46 and second 48 ducts, wherein a first portion of the inflation gas 24 is discharged into the interior 88 of the air bag cushion portion 30 through one or more of the first 56 or second 62 outlets, or the third 144 or fifth 178 openings, of the first 46 and second 48 ducts; and a second portion of the inflation gas 24 is discharged to the exterior 152 of the air bag 10 through one or both of the first 150.1 and second 150.2 vent openings. The first portion of the inflation gas 24 causes the air bag cushion portion 30 to inflate.

Referring to FIG. 2, an out-of-position occupant 34' in proximity to the air bag 10 and blocking the extension of the face panel 40 of the deploying air bag 10 prevents the first 116.1 and second 116.2 control elements from releasing the associated first 130 and second 132 releasable stitches, causes the first 96.1 and second 96.2 valve elements to remain closed so as to obstruct the second 84 and fourth 160 openings in the first 46 and second 48 ducts, thereby causing substantially all of the inflation gas 24 to flow through the first 46 and second 48 ducts. The first 46 and second 48 ducts act to attenuate the flow therethrough and also act to provide for discharging the second portion of the inflation gas 24 through one or both of the first 150.1 and second 150.2 vent openings, thereby reducing the total amount of inflation gas 24 that would otherwise inflate the air bag cushion portion 30. The first 150.1 and second 150.2 vent openings are smaller than to first 158.1 and second 158.2 primary vents, and are sized so as to prevent the over-pressurization and potential resulting failure of the first 46 and second 48 ducts. Accordingly, responsive to the interaction of the air bag 10 with an out-of-position occupant 34' positioned so as to prevent extension of the face panel 40 of the air bag 10 sufficient to enable the first 116.1 and second 116.2 control elements to release the first 96.1 and second 96.2 valve elements, the airbag 10 is inflated with the second portion of the inflation gas 24 from the lateral portions thereof through the associated first 46 and second 48 ducts, which provides for reducing forces to and mitigating injury to the out-of-position occupant 34' relative to inflation with all of the inflation gas 24 directly into the interior 88 of the air bag cushion portion 30.

However, referring to FIGS. 5 and 6, when an unimpeded air bag 10 is inflated, the face panel 40 of the deploying air bag 10 is free to fully extend responsive to filling the interior 88 of the air bag cushion portion 30 with the second portion of the inflation gas 24. As the interior 88 of the air bag cushion portion 30 fills with inflation gas 24, the first 118 and second 174 relatively distal portions of the face panel 40 extend, thereby extending the associated first 122.1 and second 122.2 tensile elements of the first 116.1 and second 116.2 control elements, the distal portions 124 of which are attached thereat. Referring to FIG. 5, the first 122.1 and second 122.2 tensile elements become taut when the extension of the first 118 and second 174 relatively distal portions meet or exceed corresponding respective first 120 and second 176 thresholds relative to the first opening 44. Referring to FIG. 6, subsequent additional inflation of the air bag cushion portion 30 and the resulting further extension of the first 118 and second 174 relatively distal portions causes the first 122.1 and second 122.2 tensile elements to be pulled from the associated first 130 and second 132 releasable stitches of each of the associated first 116.1 and second 116.2 control elements, thereby releasing the first 130 and second 132 releasable stitches so as to enable the associated first 96.1 and second 96.2 valve elements to open, thereby providing for the inflation gas 24 from the manifold 76 to discharge directly into the interior 88 of the air bag cushion portion 30 through the second 84 and fourth 160 openings located proximate to the proximal portions of the first 46 and second 48 ducts. Most of the inflation gas 24 then discharges through the relatively large and relatively proximal second 84 and fourth 160 openings directly into the interior 88 of the air bag cushion portion 30, rather through the remainder of first 46 and second 48 ducts, thereby reducing the loss of inflation gas 24 to the exterior 152 of the air bag 10 through the first 105.1 and second 150.2 vent openings, which provides for inflating the air bag cushion portion 30 both more quickly and more fully than when the inflation of the air bag 10 is impeded by the presence of a proximate out-of-position occupant 34' as illustrated in FIG. 2.

For example, the first 46 and second 48 ducts are adapted so that the pressurization thereof caused by the flow of inflation gas 24 thereinto and therethrough causes the first 46 and second 48 ducts to expand and unfold in the design direction of the first 46 and second 48 ducts. By expanding along their length, the first 46 and second 48 ducts provides for inflating the air bag cushion portion 30 so as to unfold in a direction that can reduce forces to an out-of-position occupant 34'. The second 84 and fourth 160 openings in cooperation with the first 46 and second 48 ducts provide for more quickly filling the air bag cushion portion 30 when unimpeded by an out-of-position occupant 34', which provides for incorporating the first 46 and second 48 ducts in a relatively larger air bag 10 without the disadvantage of relatively slower inflation for a normally seated occupant 34.

Figure 9:
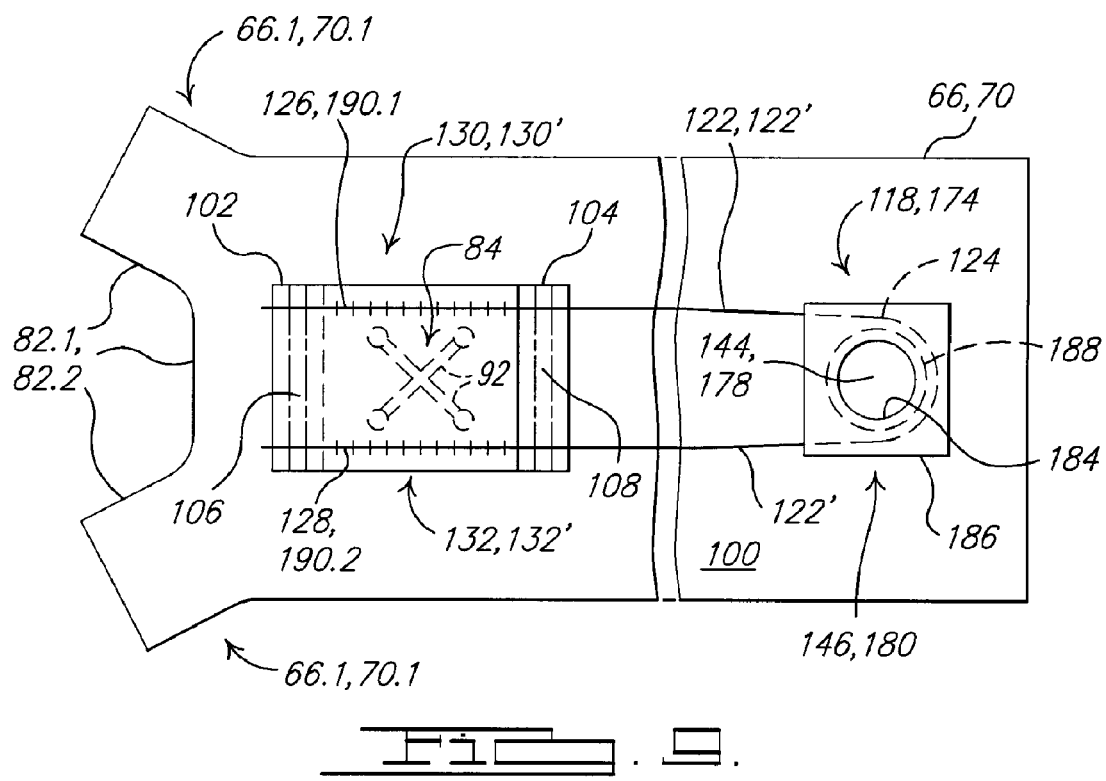
FIG. 9 illustrates a plan view of a second embodiment of a duct assembly prior to assembly in an air bag.

Referring to FIG. 9, alternatively, the distal portion 124 of the at least one tensile element 122 may be operatively coupled to a relatively distal portion 118, 174 of the first 66 or second 70 panel that forms the first 46 or second 48 duct, respectively, for example, attached proximate to a perimeter 184 of the associated third 144 or fifth 178 opening therein, for example, sandwiched between the first 66 or second 70 panel and an associated reinforcing patch 186 surrounding the perimeter 184 of third 144 or fifth 178 opening. Furthermore, the at least one tensile element 122 may comprise a single tensile element 122', the distal portion 118, 174 of which comprises a central portion 188 of the single tensile element 122', and the first 126 and second 128 proximal portions of which comprise first 190.1 and second 190.2 ends of the single tensile element 122', wherein the central portion 188 of the single tensile element 122' is wrapped around the third 144 or fifth 178 opening between the first 66 or second 70 panel of the first 46 or second 48 duct and the associated reinforcing patch 186.

Referring to FIGS. 10-15*b*, a plurality of additional aspects and embodiments of the first 96.1 or second 96.2 valve elements and associated first 116.1 or second 116.2 control elements will now be described with reference to a control element 116 adapted to control the actuation of a valve element 96 operative in cooperation with an opening 192 in a duct 194. It should be understood that these additional aspects and embodiments can also be incorporated in either the first 116.1 or second 116.2 control elements adapted to control the actuation of either the first 96.1 or second 96.2 valve elements operative in cooperation with either the second opening 84 of the first duct 46 or the fourth opening 160 of the second duct 48, respectively.

Figure 10:
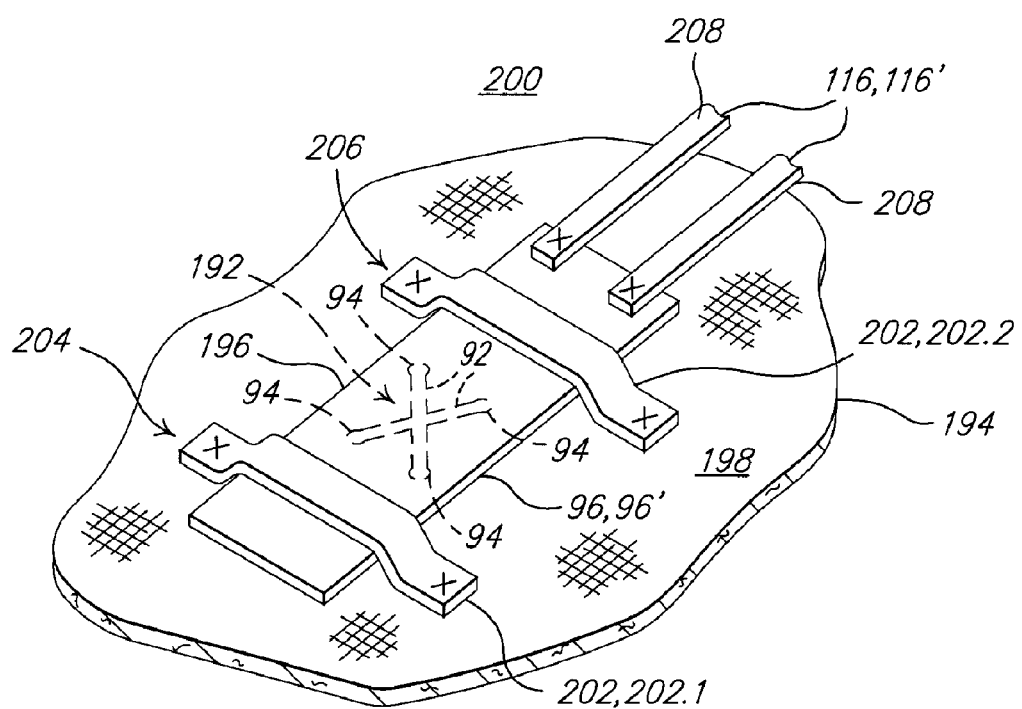
FIG. 10 illustrates a first embodiment of a second aspect of a valve element attached to an inside surface of a duct.

Referring to FIGS. 10-12, in accordance with a second aspect, the valve element 96' comprises a slide valve 196 located on a second side 198 of the duct 194 facing an interior 200 thereof, i.e. the inside 198 of the duct 194. For example, the slide valve 196 may be constructed of a material that provides for slidable valve action in cooperation with the air bag 10, for example, air bag material 32 or sheet plastic. The slide valve 196 is slideably disposed within at least one guide 202 operatively coupled to the duct 194. For example, the at least one guide 202 may be constructed of air bag material 32 that is joined to the duct 194 by sewing, bonding or welding.

Referring to FIG. 10, in accordance with a first embodiment of the second aspect, the at least one guide 202 comprises first 202.1 and second 202.2 guides, wherein the first guide 202.1 is operatively coupled to the duct 194 proximate to a first location 204, and the second guide 202.2 is operatively coupled to the duct 194 proximate to a second location 206, with the first 204 and second 206 locations spanning—at relatively proximal 204 and relatively distal 206 locations respectively—the opening 192 in the duct 194. Accordingly, the first 202.1 and second 202.2 guides provide for locating the slide valve 196 so as to normally obstruct the opening 192, which is illustrated as a pair of cross-cuts 92 terminated with associated stress-relief holes 94. Alternatively, the opening 192 could comprise a cut-out portion of the duct 194, e.g. an orifice therein. With the slide valve 196 located on the second side 198 of the duct 194 facing the interior 200 thereof, a pressurization of the duct 194 by the inflation gas 24 will tend to further seal the slide valve 196 against the second side 198 of the duct 194 so as to maintain the obstruction thereby of the opening 192 in the duct 194. The slide valve 196 is operatively coupled to a plurality of tensile elements 208, e.g. straps, of an associated control element 116' which provide for slidably opening the slide valve 196 responsive to a tension in at least one of the plurality of tensile elements 208. For example, the plurality of tensile elements 208 may be constructed of either thread, a fabric cord, or air bag material 32, and, for example, may be attached to the slide valve 196 by, for example, sewing, stitching, bonding or welding.

Referring to FIG. 11, in accordance with a second embodiment of the second aspect, the at least one guide 202 comprises a single guide 202' operatively coupled to the second side 198 of the duct 194 in an opposed relationship with respect to the opening 192 in the duct 194, wherein the single guide 202' incorporates an opening 210 therein adapted to cooperate with the opening 192 in the duct 194 so as to provide for the flow of inflation gas 24 through both openings 192, 210 when the slide valve 196 is not interposed therebetween. For example, the opening 210 in the single guide 202' may comprise either as a pair of cross-cuts 212 terminated with associated stress-relief holes 214 as illustrated in FIG. 11, or a cut-out portion of the single guide 202', e.g. an orifice therein. The slide valve 196 is operatively coupled to a tensile element 208, e.g. a strap, of an associated control element 116' which provides for slidably opening the slide valve 196 responsive to a tension in the tensile element 208.

Referring to FIG. 12, in accordance with a third embodiment of the second aspect, the control element 116''' comprises an extension of the associated valve element 96", for example, wherein both the control element 116" and the valve element 96" are constructed of air bag material 32, and the valve element 96" comprises a slide valve 196' that cooperates with a single guide 202' incorporating an opening 210 as described hereinabove with reference to FIG. 11 for the second embodiment of the second aspect.

Referring to FIGS. 13-15*b*, in accordance with a third aspect, the valve element 96''' comprises first 210 and second 212 lattices that are folded or wrapped around respective first 215 and second 216 insertion spaces so as to form respective first 218 and second 220 pluralities of fingers extending from respective first 222 and second 224 base portions. The first 222 and second 224 base portions are operatively coupled—for example, by sewing, bonding or welding—to the first side 100 of the duct 194 (e.g. facing the interior 88 of the air bag cushion portion 30) on opposing sides 226, 228 of the opening 192 in the duct 194. The first 218 and second 220 pluralities of fingers are adapted to interlock with one another across the opening 192 in the duct 194. A control element 116"" comprises a link 230 inserted through the first 215 and second 216 insertion spaces within the first and second pluralities of fingers so as to establish the interlocking relationship between the first 218 and second 220 pluralities of fingers, thereby obstructing the opening 192 in the duct 194 so as to substantially prevent a flow of inflation gas 24 therethrough. For example, the link 230 may comprise a first portion 232 of air bag material 32 of the associated control element 116"", e.g. which is folded and sewn together, and which, for example, may incorporate a stiffening element, e.g. a plastic rod, therein. The valve element 96"" may further comprise a layer 234 of material, for example air bag material 32 or sheet plastic, between the first side 100 of the duct 194 and a proximate side 236 of the first 218 and second 220 pluralities of fingers so as to provide for improved sealing of the opening 192 in the duct 194. For example, the layer 234 of material may be attached to the proximate side 236 of one of the first 218 or second 220 pluralities of fingers or first 222 and second 224 base portions, may be attached between one of the first 222 and second 224 base portions and the duct 194, may be attached at one end to the duct 194, or may be unattached to the duct 194 and the remainder of the valve element 96"".

In operation, the link 230 engaged with the first 215 and second 216 insertion spaces of interlocking first 218 and second 220 pluralities of fingers provides for obstructing the opening 192 in the duct 194 50 as to prevent a flow of inflation gas 24 therethrough. Upon inflation of the air bag cushion portion 30 sufficient to actuate the control element 116"", the associated link 230 is pulled from the first 215 and second 216 insertion spaces by the control element 116"", thereby providing for the first 218 and second 220 pluralities of fingers to open, thereby exposing the opening 192 in the duct 194 and providing for a flow of inflation gas 24 therethrough.

Referring to FIGS. 16-19, in accordance with a second embodiment, the inflated air bag 10" in accordance with U.S. application Ser. No. 10/908,954, incorporated herein by reference, comprises first 30.1 and second 30.2 air bag cushion portions that are joined together along respective first 240 and second 242 inboard boundaries, and which together define a first opening 44 that is adapted to operatively couple to the air bag inflator module 12 and receive inflation gas from the air bag inflator 22. For example, the first 240 and second 242 inboard boundaries may be joined together by sewing, bonding or welding, or they may be part of a single piece air bag 10" that is either joined together or molded, e.g. a blow-molded air bag 10", or a multiple component air bag 10" that is either joined together or molded. The profile of the first 240 and second 242 inboard boundaries is smaller than the corresponding outer profile of the first 30.1 and second 30.2 air bag cushion portions so that the combination of the first 30.1 and second 30.2 air bag cushion portions results in an overall bi-lobular air bag cushion 244.

Figure 19:
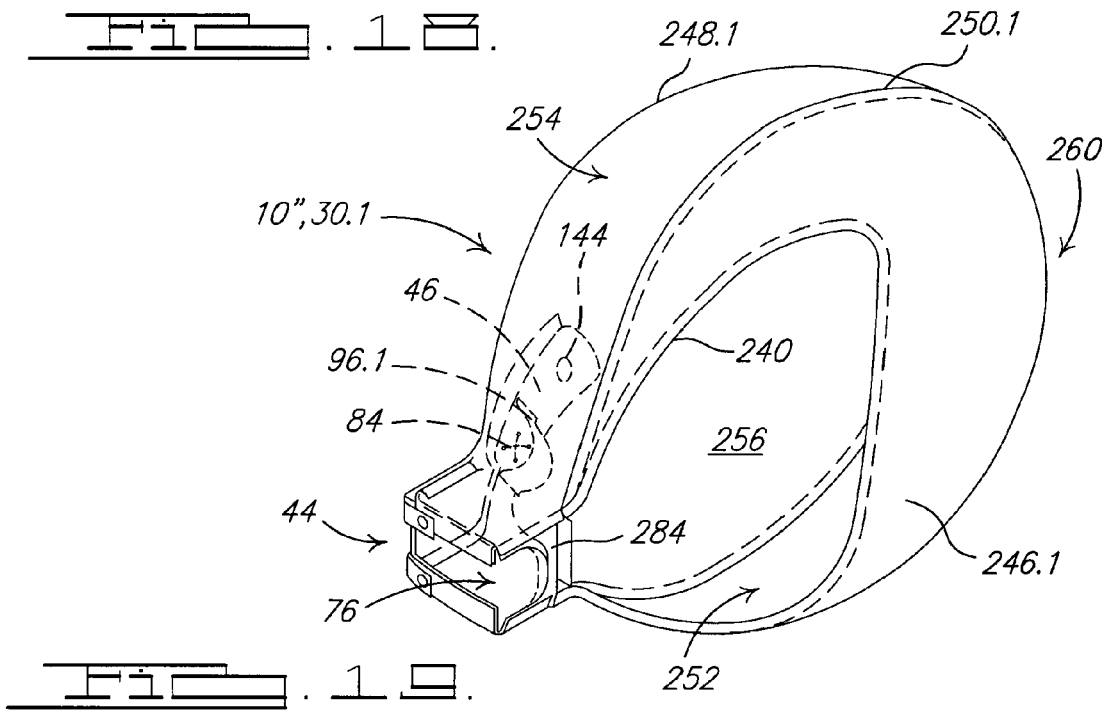
FIG. 19 illustrates an isometric view of a first air bag cushion portion in an inflated state, and a cross sectional view of an associated manifold proximate to the opening of the air bag, in accordance with the air bag illustrated in FIG. 16.

The first 30.1 and second 30.2 air bag cushion portions are formed, for example, by joining associated respective first 246.1 and second 246.2 inboard panels to one another and to respective first 248.1 and second 248.2 outboard panels, respectively, along associated first 250.1 and second 250.2 seams, as illustrated in greater detail in FIG. 19 for the first air bag cushion portion 30.1. For example, the first 246.1 and second 246.2 inboard panels and the first 248.1 and second 248.2 outboard panels may be constructed of air bag material known in the art, for example, a fabric, e.g. of nylon or polyester weave, which may be coated, e.g. with a silicone rubber coating; some other material that is known for use in fabricating an air bag such as plastic film or polyolefin (e.g. TYVEK®), or some other material that is sufficiently flexible, strong and durable for use in confining inflation gases generated by the air bag inflator 22 and for interacting with an occupant so as to provide for occupant restraint. Furthermore, the first 246.1 and second 246.2 inboard panels may be joined to the respective first 248.1 and second 248.2 outboard panels by sewing, bonding or welding, or they may be part of a single piece air bag 10" that is either joined together or molded, e.g. a blow-molded air bag 10", or a multiple component air bag 10" that is either joined together or molded.

In accordance with a first aspect, the first air bag cushion portion 30.1 is divided into first 252 and second 254 chambers by a first inner panel 256, which, for example, extends along the height of the first air bag cushion portion 30.1 from the junction of the first 240 and second 242 inboard boundaries proximate to the first opening 44, to a relatively distal location within the first air bag cushion portion 30.1. For example, the edges of the first inner panel 256 are sewn into the first seam 250.1 joining the first inboard panel 246.1 to the first outboard panel 248.1 of the first air bag cushion portion 30.1. For example, in one embodiment, the first seam 250.1 is substantially laterally centered within the first air bag cushion portion 30.1. The first inner panel 256 is adapted to provide for fluid communication between the first 252 and second 254 chambers, for example, via a gap 258 between an end of the first inner panel 256 and the inside of a distal end 260 of the first air bag cushion portion 30.1. Alternatively, the first inner panel 256 could extend to the distal end 260 of the first air bag cushion portion 30.1, and a distal end 262 of the first inner panel 256 could be adapted with one or more orifices therein so as to provide for the fluid communication between the first 252 and second 254 chambers.

Further in accordance with the first aspect, the second air bag cushion portion 30.2 is divided into third 264 and fourth 266 chambers by a second inner panel 268, which, for example, extends along the height of the second air bag cushion portion 30.2 from the junction of the first 240 and second 242 inboard boundaries proximate to the first opening 44, to a relatively distal location within the second air bag cushion portion 30.2. For example, the edges of the second inner panel 268 are sewn into the second seam 250.2 joining the second inboard panel 246.2 to the second outboard panel 248.2 of the second air bag cushion portion 30.2. For example, in one embodiment, the second seam 250.2 is substantially laterally centered within the second air bag cushion portion 30.2. The second inner panel 268 is adapted to provide for fluid communication between the third 264 and fourth 266 chambers, for example, via a gap 270 between an end of the second inner panel 268 and the inside of a distal end 272 of the second air bag cushion portion 30.2. Alternatively, the second inner panel 268 could extend to the distal end 272 of the second air bag cushion portion 30.2, and a distal end 274 of the second inner panel 268 could be adapted with one or more orifices therein so as to provide for the fluid communication between the third 264 and fourth 266 chambers.

The first 256 and second 268 inner panels are, for example, joined to one another where they meet at the first 240 and second 242 inboard boundaries of the first 30.1 and second 30.2 air bag cushion portions. The first 252 and third 264 chambers are in fluid communication across the first 240 and second 242 inboard boundaries of the first 30.1 and second 30.2 air bag cushion portions. Furthermore, the second 254 and fourth 266 chambers are in fluid communication with the first opening 44 of the air bag 10". Accordingly, the first 256 and second 268 inner panels provide for directing the inflation gases from the air bag inflator 22 first to the outer second 254 and fourth 266 chambers, and then to the central first 252 and third 264 chambers, which provides for urging a lateral inflation of the air bag 10". Typically the flow of inflation gases into the first 252 and third 264 chambers occurs later in the deployment process, but occurs sufficiently early so as to provide sufficient restraint capability in order to protect a normally seated relatively larger occupant from harm, but sufficiently late so as to not injure an out-of-position occupant 34' relatively early in the deployment process.

In accordance with a second aspect, a first duct 46 is provided between the first opening 44 and a relatively distal portion 276 of the first air bag cushion portion 30.1 along an inside surface of a first outboard boundary 278, e.g. the first outboard panel 248.1, thereof so a to provide for fluid communication therethrough and therealong between the first opening 44 and the first air bag cushion portion 30.1. For example, in combination with the first aspect, the first duct 46 provides for distributing inflation gas to a relatively distal portion 276 of the second chamber 254.

Further in accordance with the second aspect, a second duct 48 is provided between the first opening 44 and a relatively distal portion 280 of the second air bag cushion portion 30.2 along an inside surface of a second outboard boundary 282, e.g. the second outboard panel 248.2, thereof so a to provide for fluid communication therethrough and therealong between the first opening 44 and the second air bag cushion portion 30.2. For example, in combination with the first aspect, the second duct 48 provides for distributing inflation gas to a relatively distal portion 280 of the fourth chamber 266.

Figure 16:
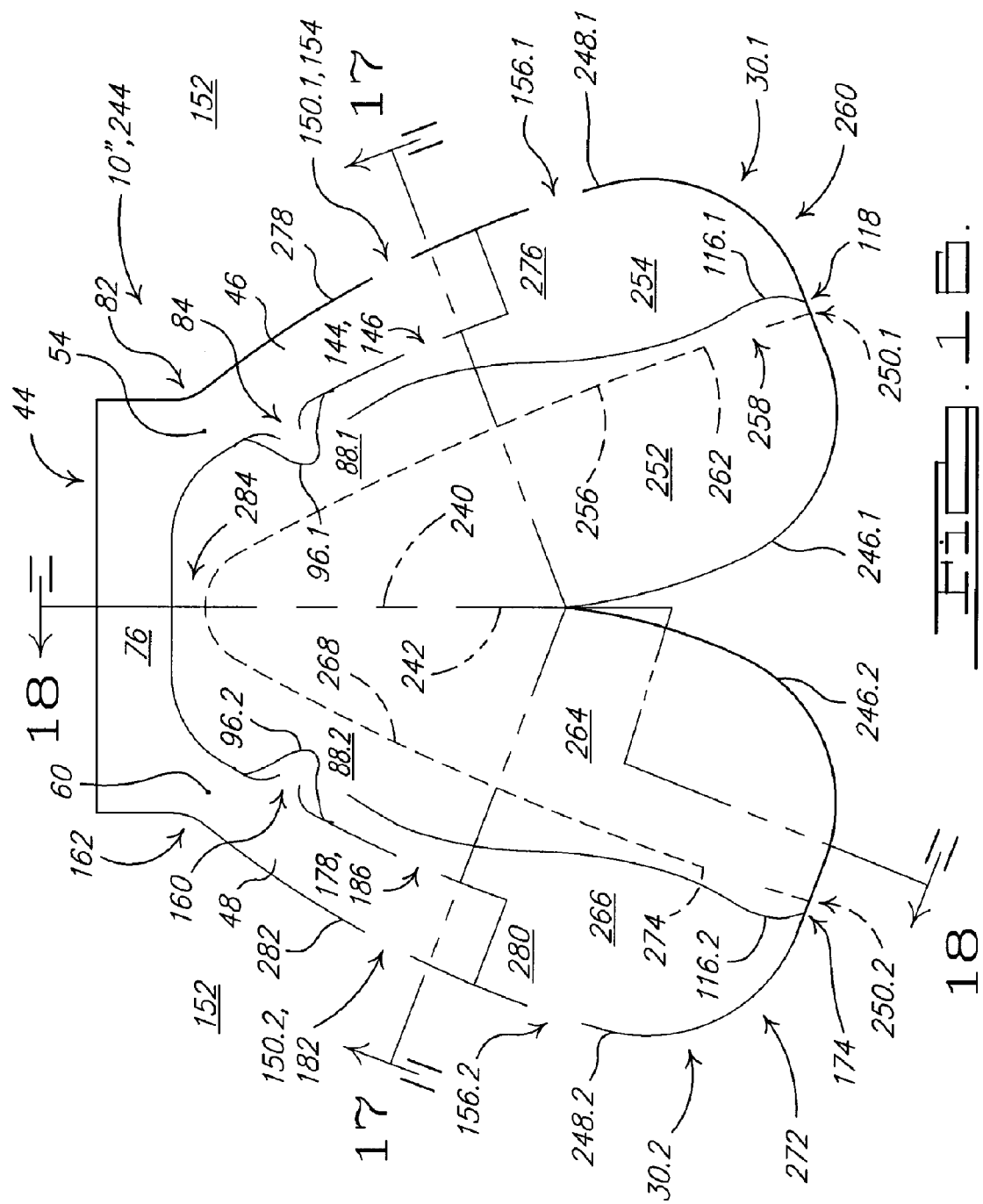
FIG. 16 illustrates a top cross-sectional view of a second embodiment of an inflated air bag incorporating several aspects.
Figure 17:
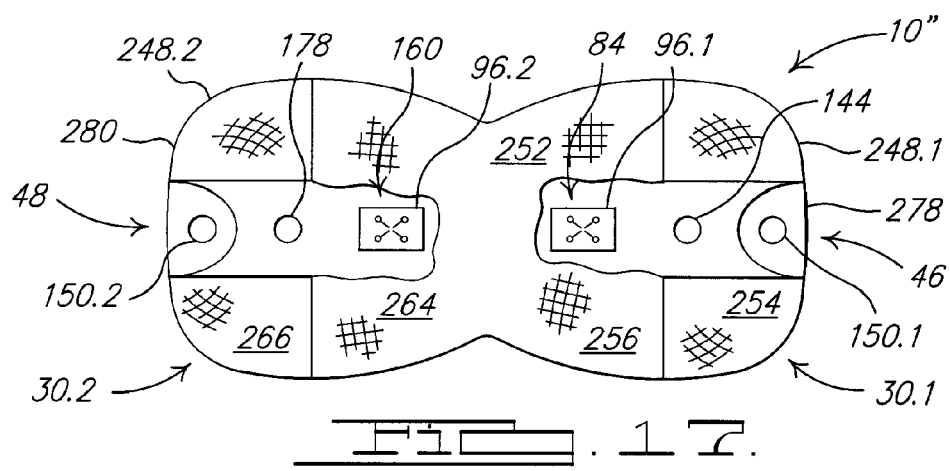
FIG. 17 illustrates a first cross-sectional view of the air bag illustrated in FIG. 16.
Figure 18:
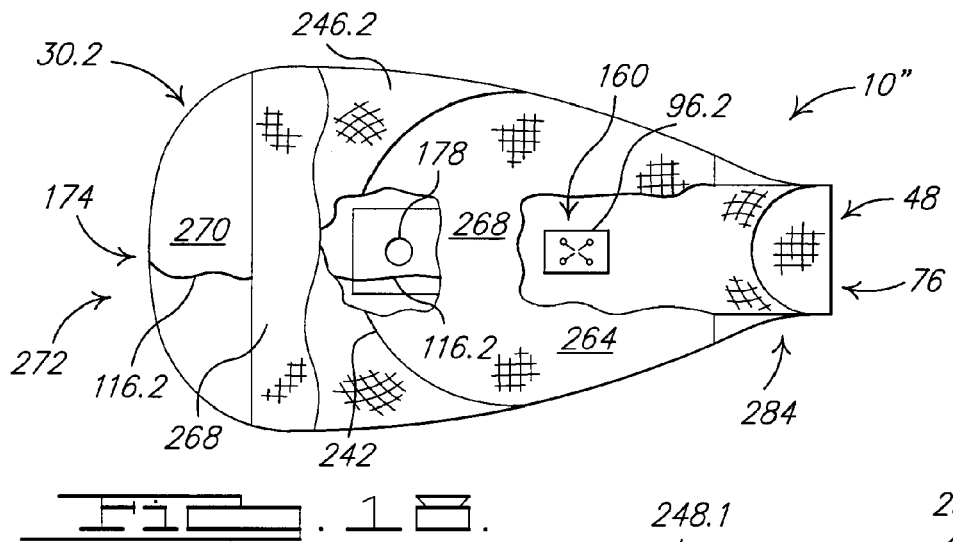
FIG. 18 illustrates a second cross-sectional view of the air bag illustrated in FIG. 16.

Referring to FIGS. 16 and 19, in one embodiment, the first 46 and second 48 ducts are either joined to one another proximate to the first opening 44 so as to form a manifold 76 proximate to the first opening 44, wherein the manifold provides for distributing inflation gas received through the first opening 44 to either the first 46 or second 48 ducts. Alternatively, the manifold 76 could be constructed of a separate element to which the first 46 and second 48 ducts would be connected. For example, the manifold 76 is typically adapted so as to direct substantially all of the inflation gas received through the first opening 44 to either the first 46 or second 48 ducts. Furthermore, the manifold 76 may cooperate with the first 256 and second 268 inner panels so as to either provide for a gap 284 therebetween, as illustrated in FIGS. 16 and 19—thereby providing for fluid communication therethrough between the second 254 and fourth 266 chambers—or the first 256 and second 268 inner panels may be substantially sealed to the manifold 76.

For example, the first 46 and second 48 ducts and the manifold 76 may be fabricated by joining one or more pieces of air bag material to the inside of the outboard boundaries 278, 282 of the air bag 10", or to the inside of the first opening 44 of the air bag 10". For example, the first 46 and second 48 ducts and the manifold 76 may be constructed of air bag material known in the art, for example, a fabric, e.g. of nylon or polyester weave, which may be coated, e.g. with a silicone rubber coating; some other material that is known for use in fabricating an air bag such as plastic film or polyolefin (e.g. TYVEK®), or some other material that is sufficiently flexible, strong and durable for use in confining inflation gases generated by the air bag inflator 22 and for interacting with an occupant so as to provide for occupant restraint. Furthermore, the first 46 and second 48 ducts and the manifold 76 may be joined to the inside of the outboard boundaries 278, 282 or to the first opening 44 by sewing, bonding or welding, or they may be part of a single piece air bag 10" that is either joined together or molded, e.g. a blow-molded air bag 10", or a multiple component air bag 10" that is either joined together or molded.

The first 46 and second 48 ducts cause the inflation gas from the air bag inflator 22 to initially flow away from the center of the face of the air bag inflator module 12 and toward the two bag "wings" which form the right and left sides of the completed "split bag assembly". The initial gas flow toward the right and left of the air bag inflator module 12 causes the air bag 10" to initially deploy outward toward the right and left of the occupant so that contact pressures build up on either side of the occupant's chest rather than in the center thereof. Deployment to either side results in lower contact pressures on each side of the chest thus avoiding high center of chest loading.

The first and second aspects provide for reducing the injury level to an out-of-position occupant (OOP) for mid-mount air bag applications, for example, when a "split air bag" is utilized in a mid-mount application. A mid-mount air bag installation places the air bag module door 28 directly in front of the chest of a 3 year old or 6 year old dummy in the NHTSA-1 position (i.e. chest adjacent to panel), which can otherwise cause chest impact pressures to exceed the Federal Standard as the air bag module door begins to open and the air bag begins to deploy. By urging a lateral deployment of the air bag 10" to the left and right of the occupant so that contact pressures build up on either side of the chest rather than in the center, the center of chest overpressure can be reduced. Deployment to either side results in lower contact pressures on each side of the chest and avoids the high center of chest loading that could otherwise be problematic. Although the two aspects in combination provide for lowering the center of chest contact pressures for out-of-position occupants, thereby enabling the use of a "split air bag" in a vehicle requiring a mid-mount air bag configuration, it should be understood that either of the two aspects can also be used alone in particular air bag applications, also with beneficial results. Furthermore, the air bag 10" may be further adapted in accordance with the disclosure hereinabove with respect to the embodiments and aspects illustrated in FIGS. 2-15b so as to provide for bypassing inflation gas 24 from the first 46 and second 48 ducts directly into the interior 88.1, 88.2 of the first 30.1 and second 30.2 air bag cushion portions when the deployment of the air bag 10" is unimpeded, for example, as in the case of a normally seated occupant 34.

More particularly, the first 46 and second 48 ducts can be adapted to incorporate respective second 84 and fourth 160 openings located proximate to respective proximal portions 86, 162 of the first 46 and second 48 ducts, respectively, relative to the first opening 44. The second opening 84, when not otherwise obstructed, is adapted to provide for fluid communication between the first duct 46 proximate to a first inlet 54 thereof, and an interior 88.1 of the first air bag cushion portion 30.1, e.g. the second chamber 254 if in accordance with the first aspect. The fourth opening 160, when not otherwise obstructed, is adapted to provide for fluid communication between the second duct 48 proximate to a second inlet 60 thereof, and an interior 88.2 of the second air bag cushion portion 30.2, e.g. the fourth chamber 266 if in accordance with the first aspect. For example, the second 84 and fourth 160 openings may be constructed or adapted in accordance with any of the associated embodiments described hereinabove, for example, with reference to FIGS. 2-15b.

First 96.1 and second 96.2 valve elements in cooperative relationship with the second 84 and fourth 160 openings, respectively, are adapted to normally obstruct the second 84 and fourth 160 openings, respectively, so as to inhibit a flow 98 of inflation gas 24 therethrough. For example, the first 96.1 and second 96.2 valve elements may be constructed or adapted in accordance with any of the associated embodiments described hereinabove, for example, with reference to FIGS. 2-15b.

First 116.1 and second 116.2 control elements provide for holding the first 96.1 and second 96.2 valve elements, respectively, in normally closed positions. The first control element 116.1 is operative between the first valve element 96.1 and a first relatively distal portion 118 of either the first bag cushion portion 30.1, the first inner panel 256, or the first duct 46, and is adapted so as to provide for opening the first valve element 96.1 when the first relatively distal portion 118 of the air bag cushion portion 30, the first inner panel 256, or the first duct 46, is extended beyond a first threshold 120 relative to the first opening 44. The second control element 116.2 is operative between the second valve element 96.2 and a second relatively distal portion 174 of either the second air bag cushion portion 30, the second inner panel 268, or the second duct 48, and is adapted so as to provide for opening the second valve element 96.2 when the second relatively distal portion 174 of the air bag cushion portion 30, the second inner panel 268, or the second duct 48, is extended beyond a second threshold 176 relative to the first opening 44. For example, the first 116.1 and second 116.2 control elements may be constructed or adapted in accordance with any of the associated embodiments described hereinabove, for example, with reference to FIGS. 2-15b.

The first 46 and second 48 ducts may further incorporate respective third 144 and fifth 178 openings therein located at respective relatively distal locations 146, 180 relative to the second 84 and fourth 160 openings, respectively, i.e. downstream thereof, and adapted to provide for fluid communication between the first 46 and second 48 ducts, respectively, and the respective interiors 88.1, 88.2 of the first 30.1 and second 30.2 air bag cushion portions, or the respective second 254 and fourth 266 chambers if in accordance with the first aspect. For example, the third 144 and fifth 178 openings may be constructed or adapted in accordance with any of the associated embodiments described hereinabove, for example, with reference to FIGS. 2-15b.

The first 46 and second 48 ducts may further cooperate with respective first 150.1 and second 150.2 vent openings in the respective first 278 and second 282 outboard boundaries of the first 30.1 and second 30.2 bag cushion portions, respectively, adapted to provide for fluid communication between the first 46 and second 48 ducts and an exterior 152 of the first 30.1 and second 30.2 bag cushion portions. The first vent opening 150.1 is located at a relatively distal location 154 relative to the second opening 84, and the second vent opening 150.2 is located at a relatively distal location 182 relative to the fourth opening 160. The first 150.1 and second 150.2 vent openings provide as necessary for preventing an over-pressurization of the first 46 and second 48 ducts, respectively, from the inflation gas 24 flowing therethrough. For example, the first 150.1 and second 150.2 vent openings may be constructed or adapted in accordance with any of the associated embodiments described hereinabove, for example, with reference to FIGS. 2-15b.

The first 278 and second 282 outboard boundaries of the first 30.1 and second 30.2 bag cushion portions, respectively, may incorporate respective first 156.1 and second 156.2 primary vents adapted to provide for venting inflation gas 24 from the first 30.1 and second 30.2 bag cushion portions responsive to an interaction thereof with an occupant 34 responsive to a crash, so as to provide for dissipating the energy of the occupant 34 relative to the vehicle 16. For example, the first 156.1 and second 156.2 primary vents may be constructed or adapted in accordance with any of the associated embodiments described hereinabove, for example, with reference to FIGS. 2-15b.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:
1. An air bag, comprising:
 a. at least a first air bag cushion portion, wherein said at least a first air bag cushion portion comprises air bag material, and said at least a first air bag cushion portion comprises at least a first outboard boundary;

b. a first opening adapted to receive inflation gas from an air bag inflator;
c. a first duct operative between said first opening and a relatively distal portion of said first air bag cushion portion along an inside of said first outboard boundary of said first air bag cushion portion so as to provide for said fluid communication between said first opening and a first distal portion of said first air bag cushion portion;
d. a second opening in said first duct, wherein said second opening is located proximate to a proximal portion of said first duct relative to said first opening, and said second opening is adapted to provide for fluid communication between said first duct and an interior of said first air bag cushion portion;
e. a first valve element, wherein said first valve element is adapted to normally obstruct said second opening so as to inhibit a flow of said inflation gas therethrough; and
f. a first control element, wherein said first control element is operative between said first valve element and a first relatively distal portion of said first air bag cushion portion or said first duct, said first control element is adapted to provide for opening said first valve element when said first relatively distal portion of said first air bag cushion portion or said first duct is extended beyond a first threshold relative to said first opening.

2. An air bag as recited in claim 1, wherein said first duct comprises a first panel of air bag material operatively coupled to said inside of said first outboard boundary of said first air bag cushion portion.

3. An air bag as recited in claim 1, wherein said second opening comprises at least one associated cut through said first duct.

4. An air bag as recited in claim 1, wherein said second opening comprises an associated cutout portion of said first duct.

5. An air bag as recited in claim 1, wherein said first valve element is located on a first side of said first duct facing said interior of said first air bag cushion portion.

6. An air bag as recited in claim 5, wherein said first valve element comprises air bag material, a first end portion of said first valve element is attached to said first duct at a first location, a second end portion of said first valve element is attached to said first duct at a second location, said first and second locations span said second opening at relatively proximal and relatively distal locations respectively, a length of said first valve element between said first and second end portions is greater than a distance between said first and second locations on said first duct, said first control element comprises at least one tensile element, a distal portion of said at least one tensile element is operatively coupled to a distal portion of either said first air bag cushion portion or said first duct, first and second proximal portions of said at least one tensile element are incorporated in corresponding first and second releasable stitches adapted to secure said first valve element to said first duct, said first and second releasable stitches engage said first valve element folded back on itself, and said first and second releasable stitches engage opposing side portions of said first valve element between said first and second locations.

7. An air bag as recited in claim 6, wherein said first and second releasable stitches comprise first and second lock stitches, loop portions of said first and second lock stitches extend through said first duct and said first valve element towards said interior of first air bag cushion portion, and said loop portions engage said first and second proximal portions of said at least one tensile element on an interior side of said first valve element so that first and second proximal portions of said at least one tensile element may be pulled through said loop portions to undo said first and second lock stitches.

8. An air bag as recited in claim 6, wherein said distal portion of said at least one tensile element is operatively coupled to an inside of a face portion of said first air bag cushion portion.

9. An air bag as recited in claim 6, wherein said distal portion of said at least one tensile element is operatively coupled to a relatively distal portion of said first duct.

10. An air bag as recited in claim 9, further comprising a third opening in said first duct, wherein said third opening is located at a relatively distal location relative to said second opening, and said third opening is adapted to provide for fluid communication between said first duct and said interior of said first air bag cushion portion, and said relatively distal portion of said first duct is proximate to a perimeter of said third opening.

11. An air bag as recited in claim 10, further comprising a first reinforcing patch at least partially surrounding said third opening and operatively coupled proximate to said perimeter of third opening, wherein said first reinforcing patch is operatively coupled to said first duct proximate to said perimeter of said third opening, said at least one tensile element comprises a single tensile element, said distal portion of said at least one tensile element comprises a central portion of said single tensile element, and said first and second proximal portions of said at least one tensile element comprise first and second ends of said single tensile element, and said central portion of said single tensile element wrapped around said third opening between said first duct and said first reinforcing patch.

12. An air bag as recited in claim 6, wherein said at least one tensile element comprises first and second tensile elements.

13. An air bag as recited in claim 6, wherein said at least one tensile element comprises a single tensile element, said distal portion of said at least one tensile element comprises a central portion of said single tensile element, and said first and second proximal portions of said at least one tensile element comprise first and second ends of said single tensile element.

14. An air bag as recited in claim 6, wherein said at least one tensile element comprises at least one thread.

15. An air bag as recited in claim 1, further comprising a third opening in said first duct, wherein said third opening is located at a relatively distal location relative to said second opening, and said third opening is adapted to provide for fluid communication between said first duct and said interior of said first air bag cushion portion.

16. An air bag as recited in claim 15, wherein said third opening comprises at least one of at least one associated cut through said first duct, and an associated cutout portion in said first duct.

17. An air bag as recited in claim 15, wherein said second opening is substantially larger than said third opening.

18. An air bag as recited in claim 1, further comprising a first vent opening, wherein said first vent opening is in said first outboard boundary of said first air bag cushion portion, said first vent opening is adapted to provide for fluid communication between said first duct and an exterior of said first air bag cushion portion, and said first vent opening is located at a relatively distal location relative to said second opening.

19. An air bag as recited in claim 17, further comprising a first vent opening, wherein said first vent opening is in said first outboard boundary of said first air bag cushion portion, said first vent opening is adapted to provide for fluid communication between said first duct and an exterior of said first air bag cushion portion, and said first vent opening is located at a relatively distal location relative to said second opening, and said third opening is larger than said first vent opening.

20. An air bag as recited in claim 1, further comprising:
a. a second duct operative between said first opening and a relatively distal portion of either said first air bag cushion portion or a second air bag cushion portion along an inside of a second outboard boundary of said first or second air bag cushion portions so as to provide for said fluid communication between said first opening and a second distal portion of either said first air bag cushion portion or said second air bag cushion portion;
b. a fourth opening in said second duct, wherein said fourth opening is along a proximal portion of said second duct relative to said first opening, and said fourth opening is adapted to provide for fluid communication between second duct and interior of said first air bag cushion portion;
c. a second valve element, wherein said second valve element is adapted to normally obstruct said fourth opening so as to inhibit a flow of said inflation gas therethrough, and
d. a second control element, wherein said second control element is operative between said second valve element and a second relatively distal portion of said first air bag cushion portion, said second air bag cushion portion, or said second duct, and said second control element is adapted to provide for opening said second valve element when said second relatively distal portion of said first air bag cushion portion, said second air bag cushion portion, or said second duct is extended relative to said first opening beyond a second threshold, said first and second ducts either constitute or are operatively coupled to a manifold proximate to said first opening, said manifold is adapted to receive said inflation gas through said first opening, and said manifold is adapted to distribute said inflation gas to said first and second ducts.

21. An air bag as recited in claim 20, wherein said second duct comprises a second panel of air bag material operatively coupled to an inside of said second outboard boundary of said first or second air bag cushion portions.

22. An air bag as recited in claim 20, wherein said second valve element is located on a first side of said second duct facing an interior of said first or second air bag cushion portions, said second valve element comprises air bag material, a first end portion of said second valve element is attached to said second duct at a third location, said second end portion of said second valve element is attached to said second duct at a fourth location, said third and fourth locations span said fourth opening at relatively proximal and relatively distal locations respectively, a length of said second valve element between said first and second end portions is greater than a distance between said third and fourth locations on said second duct, said second control element comprises at least one tensile element, a distal portion of said at least one tensile element of said second control element is operatively coupled to a distal portion of either said first air bag cushion portion, said second air bag cushion portion, or said second duct, first and second proximal portions of said at least one tensile element of said second control element are incorporated in corresponding third and fourth releasable stitches adapted to secure said second valve element to said second duct, said third and fourth releasable stitches engage said second valve element folded back on itself, and said third and fourth releasable stitches engage opposing side portions of said second valve element between said third and fourth locations.

23. An air bag as recited in claim 20, further comprising a fifth opening in said second duct, wherein said fifth opening is located at a relatively distal location relative to said fourth opening, and said fifth opening is adapted to provide for fluid communication between said second duct and said interior of said first air bag cushion portion.

24. An air bag as recited in claim 20, further comprising a second vent opening, wherein said second vent opening is in said second outboard boundary of said first air bag cushion portion, said second vent opening is adapted to provide for fluid communication between said second duct and an exterior of said first or second air bag cushion portions, and said second vent opening is located at a relatively distal location relative to said fourth opening.

25. An air bag as recited in claim 23, further comprising a second vent opening, wherein said second vent opening is in said second outboard boundary of said first air bag cushion portion, said second vent opening is adapted to provide for fluid communication between said second duct and an exterior of said first or second air bag cushion portion, and said second vent opening is located at a relatively distal location relative to said fourth opening.

26. An air bag as recited in claim 20, further comprising:
a. a third opening in said first duct, wherein said third opening is located at a relatively distal location relative to said second opening, and said third opening is adapted to provide for fluid communication between said first duct and said interior of said first air bag cushion portion;
b. a first vent opening, wherein said first vent opening is in said first outboard boundary of said first air bag cushion portion, said first vent opening is adapted to provide for fluid communication between said first duct and an exterior of said first air bag cushion portion, and said first vent opening is located at a relatively distal location relative to said second opening;
c. a fifth opening in said second duct, wherein said fifth opening is located at a relatively distal location relative to said fourth opening, and said fifth opening is adapted to provide for fluid communication between said second duct and said interior of said first air bag cushion portion;
d. a second vent opening, wherein said second vent opening is in said second outboard boundary of said first air bag cushion portion, said second vent opening is adapted to provide for fluid communication between said second duct and an exterior of said first or second air bag cushion portions, said second vent opening is adapted to provide for fluid communication between said second duct and an exterior of said first or second air bag cushion portions, said second vent opening is located at a relatively distal location relative to said fourth opening, said at least said first air bag cushion portion comprises said first air bag cushion portion, and a second air bag cushion portion, a first inboard boundary of said first air bag cushion portion is joined to a second inboard boundary of said second air bag cushion portion so that said first and second air bag cushion portions constitute a bi-lobular air bag cushion in fluid communication with said first opening, and said manifold provides for distributing said inflation gas to said first and second air bag cushion portions through said first and second ducts.

27. An air bag as recited in claim 26, wherein said first and second air bag cushion portions are in fluid communication with one another through a sixth opening bounded by said first and second inboard boundaries.

28. An air bag as recited in claim 26, further comprising:
   a. a first inner panel adapted to divide said first air bag cushion portion into a first chamber and a second chamber, wherein said first chamber is inboard of said second chamber, said first inner panel is adapted to provide for fluid communication between said first chamber and said second chamber proximate to a first end of said first air bag cushion portion, and said first end of said first air bag cushion portion is located at a relatively distal location relative to said first opening; and
   b. a second inner panel adapted to divide said second air bag cushion portion into a third chamber and a fourth chamber, wherein said third chamber is inboard of said fourth chamber, said second inner panel is adapted to provide for fluid communication between said third chamber and said fourth chamber proximate to a first end of said second air bag cushion portion, said first end of said second air bag cushion portion is located at a relatively distal location relative to said first opening, said first chamber is in fluid communication with said third chamber at said first and second inboard boundaries, said first duct is in fluid communication with said second chamber of said first air bag cushion portion, said second duct is in fluid communication with said fourth chamber of said second air bag cushion portion, and said manifold provides for distributing said inflation gas to said second and fourth chambers through said first and second ducts.

29. An air bag as recited in claim 28, wherein said first and second inner panels are either joined to one another or are continuous with one another across said first and second inboard boundaries.

30. An air bag as recited in claim 29, wherein said first and second inner panels are joined to said manifold so as to inhibit a fluid communication between said second and fourth chambers proximate to said manifold.

31. An air bag as recited in claim 29, wherein said first and second inner panels are adapted so as to provide for fluid communication between said second and fourth chambers proximate to said manifold.

* * * * *